US012063600B2

(12) United States Patent
Gutman et al.

(10) Patent No.: US 12,063,600 B2
(45) Date of Patent: Aug. 13, 2024

(54) ADAPTATION OF POWER CONTROL BASED ON NON-LINEAR INTERFERENCE ANALYSIS

(71) Applicant: QUALCOMM Incorporated, San Diego, CA (US)

(72) Inventors: Igor Gutman, Hod HaSharon (IL); Navid Abedini, Basking Ridge, NJ (US); Tao Luo, San Diego, CA (US); Pushkar Bajirao Kulkarni, San Diego, CA (US); Joseph Patrick Burke, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/549,716

(22) Filed: Dec. 13, 2021

(65) Prior Publication Data
US 2023/0189162 A1   Jun. 15, 2023

(51) Int. Cl.
*H04W 52/24*   (2009.01)
*H04W 52/14*   (2009.01)
*H04W 52/36*   (2009.01)

(52) U.S. Cl.
CPC ......... *H04W 52/24* (2013.01); *H04W 52/146* (2013.01); *H04W 52/36* (2013.01)

(58) Field of Classification Search
CPC ..................................................... H04W 52/24
See application file for complete search history.

(56) References Cited

U.S. PATENT DOCUMENTS

| | | | |
|---|---|---|---|
| 2011/0103455 A1* | 5/2011 | Forrester ........... | H04L 25/03006 375/232 |
| 2012/0088455 A1* | 4/2012 | Love .................. | H04W 52/243 455/67.11 |
| 2019/0190552 A1* | 6/2019 | Sagi .................... | H04L 25/0226 |
| 2022/0150901 A1* | 5/2022 | Wyville .............. | H04B 17/103 |

* cited by examiner

*Primary Examiner* — Hsinchun Liao
(74) *Attorney, Agent, or Firm* — Holland & Hart LLP

(57) ABSTRACT

Methods, systems, and devices for wireless communications are described. A base station may receive an uplink transmission from a user equipment (UE) over a wireless channel and measure a post-digital post-distortion (post-DPOD) signal-to-noise ratio (SNR) of the uplink transmission. The base station may generate a power output back-off indication for the UE according to the post-DPOD SNR and a change in a post-DPOD noise level of the transmission between a non-linear distortion noise component and a thermal noise component. The base station may transmit the power output back-off indication and a downlink transmission to the UE. In response, the base station may receive an uplink transmission from the UE over the wireless channel. The uplink transmission may be based on the power output back-off indication, a signal quality metric of the downlink transmission, or both.

18 Claims, 16 Drawing Sheets

ADAPTATION OF POWER CONTROL BASED ON NON-LINEAR INTERFERENCE ANALYSIS

FIELD OF TECHNOLOGY

The following relates to wireless communications, including techniques for adaptation of power control based on non-linear interference analysis.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support power control techniques for improving throughput of uplink communications.

SUMMARY

The described techniques relate to improved methods, systems, devices, and apparatuses that support adaptation of power control based on non-linear interference analysis. Generally, a base station may receive an uplink transmission from a user equipment (UE) over a wireless channel and measure a post-digital post-distortion (post-DPOD) signal-to-noise ratio (SNR) of the uplink transmission. The base station may generate a power output back-off indication for the UE according to the post-DPOD SNR and a change in a post-DPOD noise level of the transmission between a non-linear distortion noise component and a thermal noise component. The base station may transmit the power output back-off indication and a downlink transmission to the UE. In response, the base station may receive an uplink transmission from the UE over the wireless channel. The uplink transmission may be based on the power output back-off indication, a signal quality metric of the downlink transmission, or both. The present disclosure may therefore promote increased throughput and reduced latency wireless communications, among other benefits.

A method for wireless communication at a base station is described. The method may include receiving a transmission from a UE over a wireless channel, where receiving the transmission includes performing DPOD on the transmission, measuring a post-DPOD SNR of the transmission, generating a power output back-off indication for the UE according to the post-DPOD SNR and a change in a post-DPOD noise level of the transmission between a non-linear distortion noise component and a thermal noise component, and transmitting the power output back-off indication to the UE.

An apparatus for wireless communication at a base station is described. The apparatus may include a processor, memory coupled with the processor, and instructions stored in the memory. The instructions may be executable by the processor to cause the apparatus to receive a transmission from a UE over a wireless channel, where receiving the transmission includes performing DPOD on the transmission, measure a post-DPOD SNR of the transmission, generate a power output back-off indication for the UE according to the post-DPOD SNR and a change in a post-DPOD noise level of the transmission between a non-linear distortion noise component and a thermal noise component, and transmit the power output back-off indication to the UE.

Another apparatus for wireless communication at a base station is described. The apparatus may include means for receiving a transmission from a UE over a wireless channel, where receiving the transmission includes performing DPOD on the transmission, means for measuring a post-DPOD SNR of the transmission, means for generating a power output back-off indication for the UE according to the post-DPOD SNR and a change in a post-DPOD noise level of the transmission between a non-linear distortion noise component and a thermal noise component, and means for transmitting the power output back-off indication to the UE.

A non-transitory computer-readable medium storing code for wireless communication at a base station is described. The code may include instructions executable by a processor to receive a transmission from a UE over a wireless channel, where receiving the transmission includes performing DPOD on the transmission, measure a post-DPOD SNR of the transmission, generate a power output back-off indication for the UE according to the post-DPOD SNR and a change in a post-DPOD noise level of the transmission between a non-linear distortion noise component and a thermal noise component, and transmit the power output back-off indication to the UE.

Some examples of the method, apparatuses, and non-transitory computer-readable medium described herein may further include operations, features, means, or instructions for transmitting to the UE an indication of a modified power output back-off step pattern according to the change in the post-DPOD noise level of the transmission between the non-linear distortion noise component and the thermal noise component.

In some examples of the method, apparatuses, and non-transitory computer-readable medium described herein, the modified power output back-off step pattern includes a set of one or more symmetrical positive and negative power steps.

Some examples of the method, apparatuses, and non-transitory computer-readable medium described herein may further include operations, features, means, or instructions for transmitting control signaling to the UE indicating a capability of the base station to perform DPOD, where generating the power output back-off indication for the UE may be in accordance with the control signaling.

In some examples of the method, apparatuses, and non-transitory computer-readable medium described herein, a power output back-off step resolution supported by the base station, or a power output back-off step pattern supported by the base station, or both.

In some examples of the method, apparatuses, and non-transitory computer-readable medium described herein, the power output back-off indication includes an indication to decrease uplink transmit power at the UE when the non-linear distortion noise component may be larger than the thermal noise component.

In some examples of the method, apparatuses, and non-transitory computer-readable medium described herein, the power output back-off indication includes an indication to increase uplink transmit power at the UE when the non-linear distortion noise component may be smaller than the thermal noise component.

In some examples of the method, apparatuses, and non-transitory computer-readable medium described herein, the power output back-off indication includes a power back-off step selected according to a difference between the non-linear distortion noise component and the thermal noise component.

In some examples of the method, apparatuses, and non-transitory computer-readable medium described herein, the change in the post-DPOD noise level of the transmission between the non-linear distortion noise component and the thermal noise component may be determined according to the post-DPOD SNR.

A method for wireless communication a UE is described. The method may include performing a first uplink transmission to a base station over a wireless channel, receiving a power output back-off indication from the base station, the power output back-off indication based on a post-DPOD SNR of the first uplink transmission and a change in a post-DPOD noise level of the first uplink transmission between a non-linear distortion noise component and a thermal noise component, receiving a downlink transmission from the base station, and performing a second uplink transmission to the base station over the wireless channel based on the power output back-off indication, a reference signal received power (RSRP) of the downlink transmission from the base station, or both.

An apparatus for wireless communication a UE is described. The apparatus may include a processor, memory coupled with the processor, and instructions stored in the memory. The instructions may be executable by the processor to cause the apparatus to perform a first uplink transmission to a base station over a wireless channel, receive a power output back-off indication from the base station, the power output back-off indication based on a post-DPOD SNR of the first uplink transmission and a change in a post-DPOD noise level of the first uplink transmission between a non-linear distortion noise component and a thermal noise component, receive a downlink transmission from the base station, and perform a second uplink transmission to the base station over the wireless channel based on the power output back-off indication, an RSRP of the downlink transmission from the base station, or both.

Another apparatus for wireless communication a UE is described. The apparatus may include means for performing a first uplink transmission to a base station over a wireless channel, means for receiving a power output back-off indication from the base station, the power output back-off indication based on a post-DPOD SNR of the first uplink transmission and a change in a post-DPOD noise level of the first uplink transmission between a non-linear distortion noise component and a thermal noise component, means for receiving a downlink transmission from the base station, and means for performing a second uplink transmission to the base station over the wireless channel based on the power output back-off indication, an RSRP of the downlink transmission from the base station, or both.

A non-transitory computer-readable medium storing code for wireless communication a UE is described. The code may include instructions executable by a processor to perform a first uplink transmission to a base station over a wireless channel, receive a power output back-off indication from the base station, the power output back-off indication based on a post-DPOD SNR of the first uplink transmission and a change in a post-DPOD noise level of the first uplink transmission between a non-linear distortion noise component and a thermal noise component, receive a downlink transmission from the base station, and perform a second uplink transmission to the base station over the wireless channel based on the power output back-off indication, an RSRP of the downlink transmission from the base station, or both.

Some examples of the method, apparatuses, and non-transitory computer-readable medium described herein may further include operations, features, means, or instructions for receiving, from the base station, an indication of a modified power output back-off step pattern according to the change in the post-DPOD noise level of the first uplink transmission between the non-linear distortion noise component and the thermal noise component.

In some examples of the method, apparatuses, and non-transitory computer-readable medium described herein, the modified power output back-off step pattern includes a set of one or more symmetrical positive and negative power steps.

Some examples of the method, apparatuses, and non-transitory computer-readable medium described herein may further include operations, features, means, or instructions for receiving control signaling from the UE indicating a capability of the base station to perform DPOD, where the control signaling indicating the capability of the base station to perform DPOD specifies one or more of: a power output back-off step resolution supported by the base station, or a power output back-off step pattern supported by the base station, or both.

Some examples of the method, apparatuses, and non-transitory computer-readable medium described herein may further include operations, features, means, or instructions for estimating a path loss based on the RSRP of the downlink transmission, where transmitting the second uplink transmission to the base station over the wireless channel may be further based at last in part on the estimated path loss and the indicated capability of the base station to perform DPOD.

In some examples of the method, apparatuses, and non-transitory computer-readable medium described herein, the power output back-off indication includes an indication to decrease uplink transmit power at the UE when the non-linear distortion noise component may be larger than the thermal noise component.

In some examples of the method, apparatuses, and non-transitory computer-readable medium described herein, the power output back-off indication includes an indication to increase uplink transmit power at the UE when the non-linear distortion noise component may be smaller than the thermal noise component.

In some examples of the method, apparatuses, and non-transitory computer-readable medium described herein, the power output back-off indication includes a power back-off step selected according to a difference between the non-linear distortion noise component and the thermal noise component.

In some examples of the method, apparatuses, and non-transitory computer-readable medium described herein, the change in the post-DPOD noise level of the first uplink transmission between the non-linear distortion noise component and the thermal noise component may be determined according to the post-DPOD SNR.

DETAILED DESCRIPTION

Figure 1:
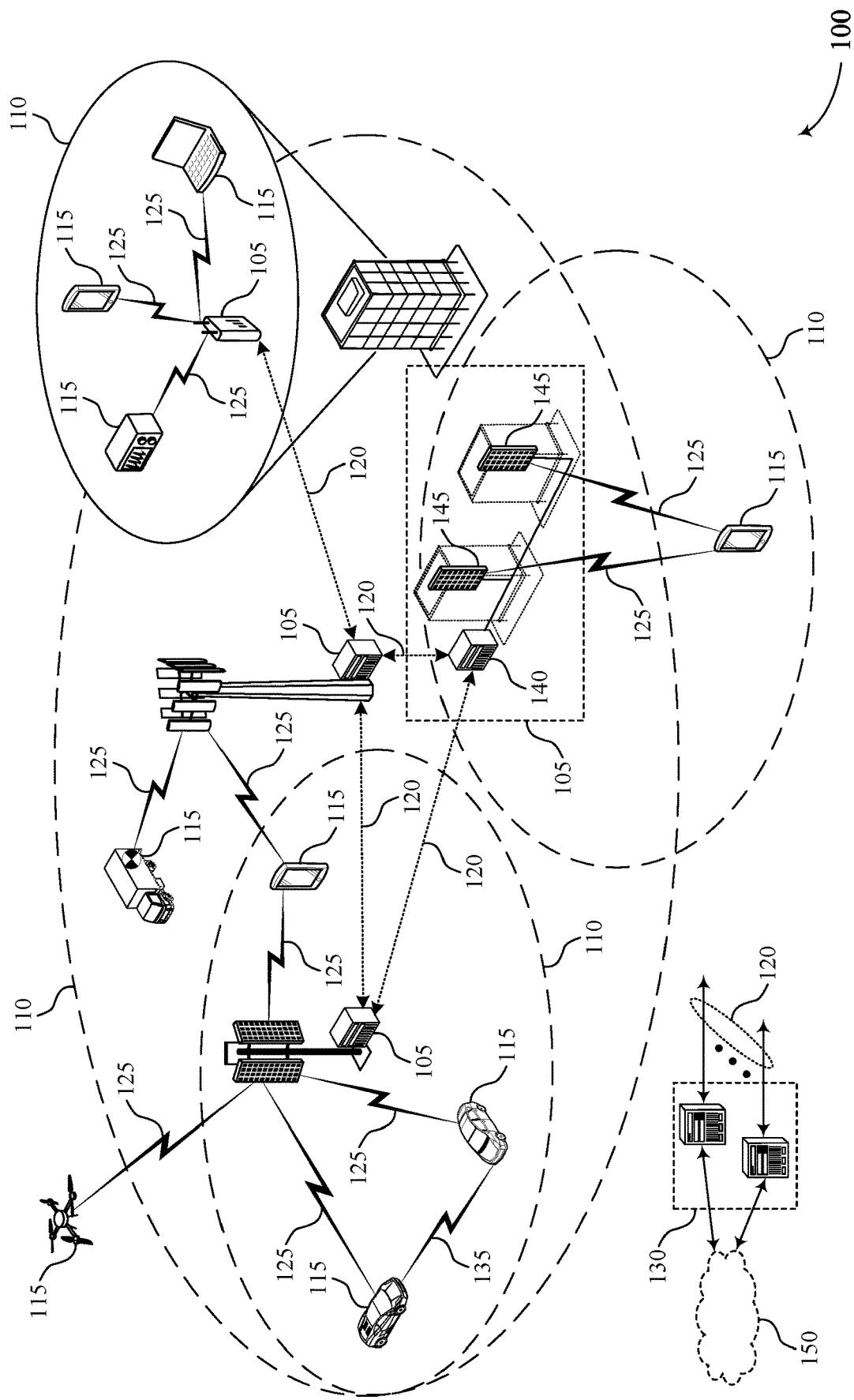
FIGS. 1 and 2 each illustrate an example of a wireless communications system that supports adaptation of power control based on non-linear interference analysis in accordance with aspects of the present disclosure.

Some wireless communications systems may include communication devices, such as user equipment (UE) and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The communication devices may, in some examples, support one or more of the above example radio access technologies. A wireless communications system may support communications between communication devices. For example, a first communication device may transmit communications (e.g., downlink communications) to a second communication device and the second communication device may transmit communications (e.g., uplink communications) to the first communication device. Some wireless communications systems may support power control techniques for improving the throughput of communications between the first communication device and second communication device. In some examples, the first communication device may be an example of a receiving device and the second communication device may be an example of a transmitting device.

For example, the second communication device (e.g., a UE) may determine an adjustment to the uplink transmit power at the second communication device based on an estimated reciprocity between downlink communications uplink communications and measurements performed on the downlink communications (e.g., reference signals). However, power adjustments determined by the second device may lack granularity, for example due to inaccuracies in the estimated reciprocity. In some examples, to increase the granularity of the transmit power control for the uplink communications (e.g., for performing uplink transmissions), the first communication device (e.g., a base station) may indicate power control adjustments to the second communication device.

In some examples, the first communications device may determine an adjustment for the transmit power at the second communication device based on measurements (e.g., signal-to-noise (SNR) measurements) performed on uplink transmissions (e.g., reference signals or data signals). The noise contributing to the measured SNR may be due to thermal noise, non-linear distortions, or both. For example, a first portion of the measured noise may be due to thermal noise and a second portion of the noise may be due to non-linear distortions. That is, the measured noise may include a thermal noise component, a non-linear distortion component, or both. In some examples, non-linear distortions of the signal (e.g., the non-linear distortion component) may result from a power amplifier or other analog component at the transmitting device (e.g., the second communication device).

However, in some examples, the first communication device may be unable to determine whether the non-linear distortion component is greater (e.g., contributing to a relatively larger portion of the measured noise) than the thermal noise component. As such, the first communication device may determine that the measured noise is due to thermal noise. Accordingly, to increase the SNR, the first communication device may determine a positive adjustment to the transmit power at the second communication device. That is, the first communication device may transmit an indication for the second communication device to increase the transmit power (e.g., at the second communication device). However, in some examples, the non-linear distortion component may be greater than the thermal noise component. In such examples, increasing the transmit power at the second communication device may increase the noise and reduce the throughput of communications (e.g., the uplink transmissions). Therefore, it may be desirable to enable one or more of the communication devices to determine whether the non-linear distortion component is greater than the thermal noise component.

Various aspects of the present disclosure generally relate to techniques for adaptation of power control based on non-linear interference analysis. For example, the first communication device may use digital post-distortion (DPOD) to compensate for non-linear noise introduced by analog components in the first communication device and the second communication device in a transmission from the second communication device to the second communication device. The signal received at the first communication device may be analyzed post-DPOD to determine an adjustment for the transmit power (e.g., uplink transmit power) at the second communication device.

In some examples, the first communication device may perform DPOD on a transmission (e.g., an uplink transmission) received from the second communication device and measure an SNR of the transmission after DPOD has been performed. For example, the first communication device may measure a post-DPOD SNR of the uplink transmission. The first communication device may determine an adjustment for the transmit power at the second communication device based on the post-DPOD SNR and whether the post-DPOD SNR is due to thermal noise or non-linear distortions (e.g., from the power amplifier at the second communication device).

For example, if the non-linear distortion component is greater than the thermal noise component (e.g., if the post-DPOD SNR is a positive value) the first communication device may determine that the post-DPOD SNR is dependent upon non-linear distortions. Accordingly, the first communication device may transmit, to the second communication device, an indication for the second communication device to decrease the uplink transmit power. That is the first communication device may transmit an indication of a negative power adjustment value to the second communication device. In response, the second communication device may adjust the uplink transmit power based on the indication from the first communication device and, optionally, measurements performed on downlink transmissions (e.g., reference signals received from the first communication device). In some examples (e.g., to further increase the granularity of the power control at the second communication device), the first communication device may indicate a step size (e.g., or step resolution) for the power control adjustment and whether the first communication device may perform DPOD (e.g., may transmit an indication of a DPOD capability to the second communication device).

Aspects of the disclosure are initially described in the context of wireless communications systems. Aspects of the disclosure are also described in the context of a power output back-off diagram and a process flow that supports techniques for adaptation of power control based on non-linear interference analysis. Aspects of the disclosure are further illustrated by and described with reference to apparatus diagrams, system diagrams, and flowcharts that relate to adaptation of power control based on non-linear interference analysis.

FIG. 1 illustrates an example of a wireless communications system 100 that supports adaptation of power control based on non-linear interference analysis in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples of the wireless communications system 100, a base station 105 may receive a communication (e.g., a first uplink transmission) from a UE 115 over a wireless channel. The base station 105 may perform DPOD on the first uplink transmission and then measure the SNR. For example, the base station 105 may measure a post-DPOD SNR of the first uplink transmission. The base station 105 may generate a power output back-off indication for the UE 115 according to the post-DPOD SNR and a change in a post-DPOD noise level (e.g., of the first uplink transmission) between a non-linear distortion noise component and a thermal noise component. The base station 105 may transmit the power output back-off indication and a downlink transmission to the UE 115. In response, the base station 105 may receive, from the UE 115, a second uplink transmission over the wireless channel. The second uplink transmission may be based on the power output back-off indication, a signal quality metric (e.g., a reference signal received power (RSRP)) of the downlink transmission, or both.

Figure 2:
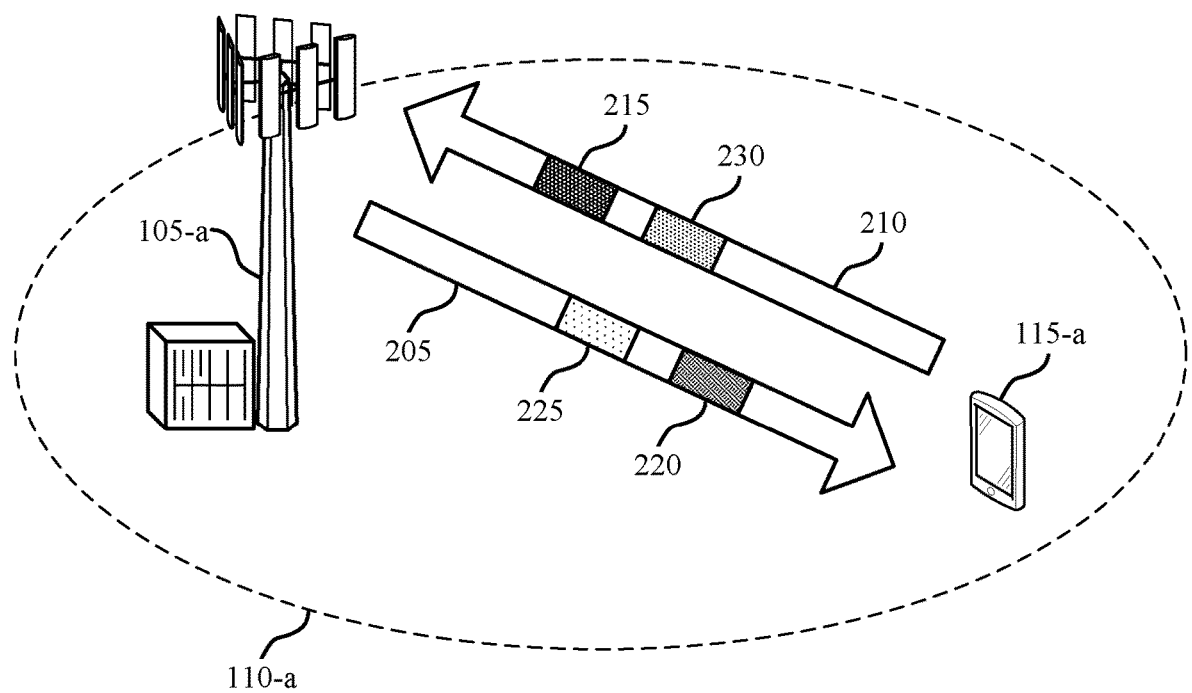
Figure 2:
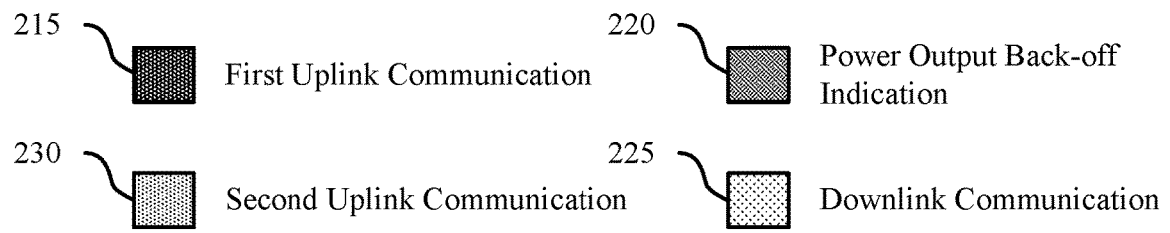

FIG. 2 illustrates an example of a wireless communications system 200 that supports adaptation of power control based on non-linear interference analysis in accordance with aspects of the present disclosure. In some examples, the wireless communications system 200 may implement aspects of the wireless communications system 100. For instance, the wireless communications system 200 may include a base station 105-a and a UE 115-a, which may be examples of the corresponding devices described with reference to FIG. 1. The wireless communications system 200 may also include a geographic coverage area 110-a, which may be an example of a geographic coverage area 110 described with reference to FIG. 1. For example, the base station 105-a may support communications with the UE 115-a within the geographic coverage area 110-a. In some examples, the base station 105-a and the UE 115-a may communicate via one or more communication links (e.g., a communication link 205 and a communication link 210). The communication link 205 may be an example of a downlink and the communication link 210 may be an example of an uplink. In some examples of the wireless communications system 200, the base station 105-a may be an example of a receiving device and the UE 115-a may be an example of a transmitting device.

The wireless communications system 200 may support power control techniques for improving the throughput of communications between communication devices. For example, one or more communication devices (e.g., the base station 105-a, the UE 115-a, or both) may implement (e.g., perform) power control techniques for determining an uplink transmit power at a transmitting device. For example, the transmit power (e.g., an uplink transmit power) may be adapted (e.g., adjusted) at the transmitting device (e.g., the UE 115-a) to improve uplink throughput or network co-channel interference. Some examples of power control techniques may include open loop power control and closed loop power control. Open loop power control techniques may refer to power control techniques in which the UE 115-a may determine the uplink power based on an estimated reciprocity between uplink and downlink communications and measurements (e.g., RSRP measurements) performed on the downlink communications.

Closed loop power control techniques may refer to power control techniques in which the receiving device (e.g., the base station 105-a) may estimate an SNR of the uplink communications (e.g., based on sounding reference signals (SRS), physical uplink control channel (PUCCH) signals, or physical uplink shared channel (PUSCH) signals) and feedback power adjustments to the UE 115-a. In some examples, open loop power control may serve as an outer loop power control, while closed loop power control may serve as an inner loop power control. That is, open loop power control may serve as a relatively coarse step of the power control and closed loop power control may serve as a relatively fine step of the power control. In some examples, closed loop power control may be faster than open loop power control.

In some examples, the base station 105-a may use power output back-off for closed loop power control. For example, the base station 105-a may receive a first uplink communication 215 from the UE 115-a over a wireless channel (e.g., via the communication link 210). The base station 105-a may perform DPOD on the first uplink communication 215 and measure a post-DPOD SNR (e.g., of the first uplink communication 215). The base station 105-a may generate a power output back-off indication 220 for the UE 115-a according to the post-DPOD SNR and a change in a post-DPOD noise level (e.g., of the first uplink communication 215) between a non-linear distortion noise component and a thermal noise component. The base station 105-a may transmit the power output back-off indication 220 and a downlink communication 225 (e.g., via the communication link 205) to the UE 115-a. In response, the base station 105-a may receive a second uplink communication 230 over the wireless channel (e.g., via the communication link 210). The second uplink communication 230 may be based on the power output back-off indication 220, a signal quality metric of the downlink communication 225, or both. In some examples, generating a power output back-off according to a post-DPOD SNR may promote increased throughput and reduced latency communications between the base station 105-a and the UE 115-a, among other benefits.

Figure 3:
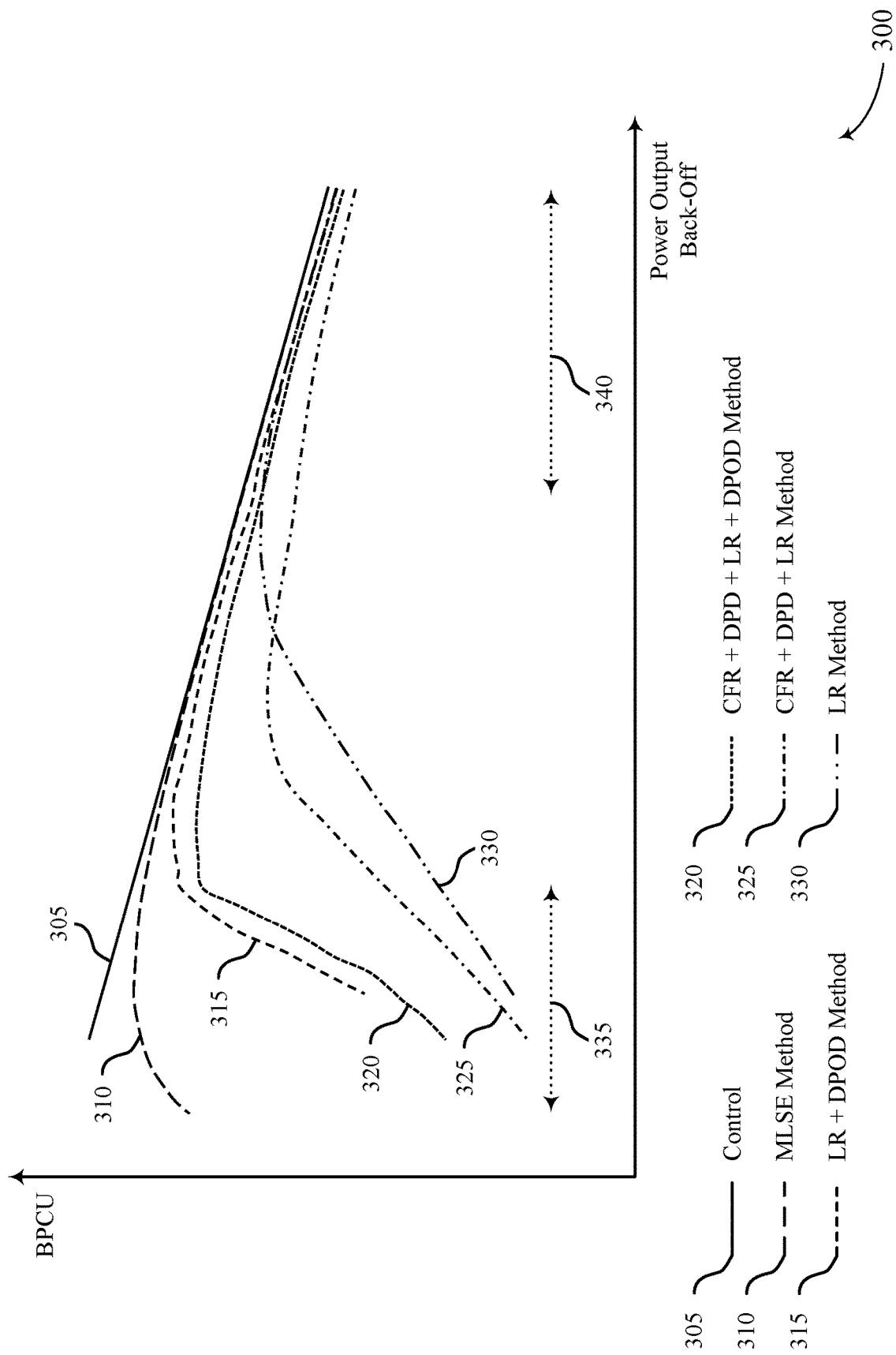
FIG. 3 illustrates an example of a power output back-off diagram that supports adaptation of power control based on non-linear interference analysis in accordance with aspects of the present disclosure.

FIG. 3 illustrates an example of a power output back-off diagram 300 that supports adaptation of power control based on non-linear interference analysis in accordance with aspects of the present disclosure. In some examples, the power output back-off diagram 300 may implement or be implemented by aspects of the wireless communications system 100 and the wireless communications system 200. For instance, the power output back-off diagram 300 may be associated with communications between a base station and a UE, which may be an example of the corresponding devices described with reference to FIGS. 1 and 2. In the example of FIG. 3, the base station may be an example of a receiving device and the UE may be an example of a transmitting device.

A transmitter (e.g., at a transmitting device) may include non-linear components, such as high-power amplifiers with limited linear dynamic range, that may distort the transmitted signal (e.g., due to high peak to average power ratio (PAPR)). For example, as the output of a power amplifier is increased (e.g., to increase the power of emitted signals) the amount of non-linear distortions in the signal may also increase. Non-linear distortions may be classified as in-band distortions, which may affect link performance (e.g., throughput, mutual information, or error vector magnitude (EVM)), and out-band distortion, which may affect (e.g., dictate) adjacent channel interference (ACI). In some examples, ACI may indicate how much an adjacent channel is impacted (e.g., polluted) by a transmission (e.g., a primary transmission). In some examples, to avoid such distortions, power output back-off may be introduced. Power output back-off may refer to a transmit power value (e.g., an amount of transmit power) compared to a potential transmit power value (e.g., a highest transmit power value or otherwise acceptable transmit power value compared to other transmit power values).

In some examples, an increased power output back-off may correspond to a reduction in the amount of signal emitted into a medium and, accordingly, a reduction in efficiency of the power amplifier (e.g., at the transmitting device). That is, a receiving device (e.g., the base station) may use power output back-off to adjust (e.g., control) the power at the transmitting device (e.g., the UE) and reduce (e.g., avoid) non-linear distortions. In some examples, the transmitting device may refer to a device at which the transmit power is being adjusted (e.g., via the power output back-off) and the receiving device may refer to a device which receives transmissions from the transmitting device, generates the power output back-off, or both. In some examples, the power output back-off may impact power efficiency at the transmitting device. For example, increasing the power output back-off may decrease the power efficiency at the transmitting device and reduce the amount of power transmitted into the channel. That is, the amount of power or energy (e.g., of a transmitted signal) dissipated into the channel as heat may increase.

In some examples, increased flexibility in ACI constraints may enable an increase in the power efficiency of a power amplifier (e.g., may enable an efficient power amplifier regime). For example, the transmitting device may use crest factor reduction (CFR) and digital pre-distortion (DPD) in the decision feedback equalizer (DFE) of the transmitting device with (e.g., as a complementary methods to) power output back-off to increase the power efficiency at the transmitting device. In sine examples, CFR may refer to a digital block used at the transmitting device to reduce the PAPR. In some examples, DPD may be an example of a technique performed at a transmitting device to linearize (e.g., compensate for estimated non-linearities) the non-linear function of the power amplifier at the transmitting device. For example, CFR may reduce a dynamic range of a signal, while DPD may aid in reducing the amount of distortions (e.g., in the signal). As a result, the power output back-off may be reduced (e.g., to a lowest value of multiple possible values) and the efficiency of the power amplifier may be improved. That is, signal processing techniques such as CFR and DPD may be implemented at a transmitting device to enable reduced power output back-off values for increased efficiency at the power amplifier.

In some examples, the receiving device (e.g., the base station) may use DPOD to improve the power efficiency at the transmitting device (e.g., the UE). DPOD may be an example of a signal processing technique performed at the receiving device to increase linearity (e.g., or compensate for estimated non-linearity) in a power amplifier at the transmitting device. In some examples, DPOD may provide one or more potential advantages (e.g., over DPD). For example, the power amplifier at the transmitting device may clip a signal (e.g., if the transmitter is operating at a power which exceeds a threshold supported by a battery supply) and the power amplifier may distort the signal (e.g., if the transmitter is operating at a reduced power). In some examples, DPD may compensate for distortions in the signal (e.g., polynomial distortions, such as in-range polynomial distortions) and may not compensate for clipping. However, DPOD may compensate for both clipping and polynomial distortions (e.g., non-linear distortions). In some examples (e.g., for high frequency bands), antenna elements at the transmitting device (e.g., transmitting antenna elements) may experience variable (e.g., different) power amplifier characteristics. For example, a single digital DPD engine may not match (e.g., correspond) to multiple (e.g., or each) power amplifier (e.g., at the transmitting device) and using DPD per transmit antenna element may not be practical (e.g., cost efficient).

In some examples, however, the receiving device (e.g., the base station) may use DPOD to estimate the non-linearity (e.g., non-linear distortions) of an antenna array (e.g., of multiple antenna elements included in an antenna array) at the receiving device. For example, the receiving device may use DPOD to estimate non-linearity of a receive antenna array and may not experience a mismatch between the estimated non-linearity and the non-linearity experienced by the antenna array elements (e.g., and may not experience a model mismatch). In some examples, DPOD may aid CFR methods, such as CFR methods which introduce in-band distortions. That is, DPOD may be used with CFR or DPD (e.g., or both) to enable reduced power output back-off values for increased efficiency at the power amplifier of the transmitting device.

For example, the power output back-off diagram 300 may illustrate the performance of methods (e.g., signal processing techniques) used by a communication device (e.g., the base station, the UE, or both) for increasing the efficiency of a power amplifier (e.g., power amplifier efficiency). In some examples, the power output back-off diagram 300 may represent the performance of such methods as bits per channel use (BPCU) as a function of the power output back-off (e.g., of the power amplifier at the transmitting device). The methods illustrated by the power output back-off diagram 300 may include a minimum likelihood sequence estimation (MLSE) method 310, a linear response (LR) plus DPOD method 315, a CFR plus DPD plus LR plus DPOD method 320, a CFR plus DPD plus LR method 325, and a LR method 330. The control 305 may represent a potential (e.g., modeled) performance function. In some examples, a LR may refer to a LR function which may be an example of a function which describes a relationship between an input (e.g., transmitted signal) and an output (e.g., received signal) of a system.

In some examples, the performance of a signal processing technique (e.g., the MLSE method 310, the LR plus DPOD method 315, the CFR plus DPD plus LR plus DPOD method 320, the CFR plus DPD plus LR method 325, or the LR method 330) may depend on a given link budget of a set of bits (e.g., the BPCU) and a given solid state power amplifier (SSPA) sharpness ($\rho$). The link budget of the BPCU may correspond to a distance ($\lambda$) between the transmitting device and the receiving device. The distance ($\lambda$) may be represented according to Equation 1:

$$\lambda = \frac{P_{sat}}{\sigma_n^2} \quad (1)$$

in which $P_{sat}$ may represent a saturation power of a power amplifier at the transmitting device, and $\sigma_n^2$ may represent a power of a terminal noise at the receiving device. For example, the respective performance of signal processing techniques illustrated by the power output back-off diagram 300 may be based on a given distance (e.g., $\lambda=40$ dB) and a given SSPA sharpness (e.g., $\rho=2$). Additionally or alternatively, an average power ratio (PAR) target (e.g., of 7 dB) may be applied for signal processing techniques which include DPD plus CFR (e.g., the CFR plus DPD plus LR plus DPOD method 320, the CFR plus DPD plus LR method 325).

In some examples, non-linear distortions and thermal noise may impact the performance of signal processing techniques based on the value of the power output back-off. For example, as illustrated in the example of FIG. 3, non-linear distortions may impact the performance of one or multiple signal processing techniques (e.g., the MLSE method 310, the LR plus DPOD method 315, the CFR plus DPD plus LR plus DPOD method 320, the CFR plus DPD plus LR method 325, and the LR method 330) for a first range of power output back-off values (e.g., a region 335) and thermal noise may impact the performance of one or multiple signal processing techniques for a second (e.g., different) range of power output back-off values (e.g., a region 340).

For example, in the region 335, a non-linear distortion component of observed noise (e.g., noise measured at the receiving device) may be greater than a thermal noise component of the observed noise. Additionally or alternatively, in the region 340, the thermal noise component of observed noise may be greater than the non-linear distortion component of the observed noise. That is, in the region 340, decreasing the power output back-off value may increase the observed noise by decreasing the amount of signal emitted into a medium. As such, the transmitting device may decrease the power output back-off (e.g., in the region 340) to increase the BPCU and improve the efficiency of the power amplifier (e.g., at the transmitting device). However, in the region 335, non-linear distortions may impact the performance of a power amplifier and, as such, decreasing the power output back-off (e.g., in the region 335) may decrease the BPCU and reduce the efficiency of the power amplifier at the transmitting device. Therefore, as illustrated in the example of FIG. 3, it may be desirable for the transmitting device to operate with a power output back-off value intermediate between the region 335 and the region 340.

In some example, the range (e.g., span) of power output back-off values occupied by the region 335 and the region 340 may change with (e.g., depend on) the signal processing technique. That is, the range of power output back-off values included in the region 335 and the range of power output back-off values included the region 340 for the MLSE method 310, the LR plus DPOD method 315, the CFR plus DPD plus LR plus DPOD method 320, the CFR plus DPD plus LR method 325, and the LR method 330 may be the same or different. In some examples of the power output back-off diagram 300, the region 335 for the LR plus DPOD method 315 and the CFR plus DPD plus LR plus DPOD method 320 may be reduced compared to the region 335 for the CFR plus DPD plus LR method 325 and the LR method 330. As such, signal processing techniques which include DPOD may provide increased performance (e.g., for lower power output back-off values and power output back-off values between the region 335 and the region 340).

As illustrated in the example of FIG. 3, BPCU (e.g., throughout) may be a function of the power output back-off. Therefore, the receiving device may use power output back-off to increase the throughput of communications (e.g., uplink communications) with the transmitting device. In some examples, signal processing techniques may not consider the noise floor components (e.g., the non-linear distortion component and the thermal noise component). For example, if SNR is estimated to be a value (e.g., 10 dB), the signal processing technique may not consider the noise floor component of the estimated (e.g., or measured) SNR value and, as such, the receiving device implementing the signal processing technique may be unaware if the measured SNR is due to the thermal noise or non-linear distortions. That is, the receiving device may be unaware if the non-linear distortion component of the observed noise is greater than the thermal noise component of the observed noise (e.g., if the value of the power output back-off is in the region 335 or in the region 340). In such an example, the receiving device may instead determine whether the transmitting device has reached a power output (e.g., a highest power output or an otherwise acceptable power output compared to other measured power outputs) and may, based on the determination, instruct the transmitting device to increase the transmit power. In some examples (e.g., if the measured SNR is due to non-linear distortions), increasing the transmit power may reduce the SNR (e.g., may increase the observed noise). In some other example, the receiving device may use DPOD to consider (e.g., determine) the noise floor of the measured SNR. For example, the receiving device may use DPOD to determine whether the observed noise is due to (e.g., controlled or dominated by) non-linear distortions or thermal noise.

In some examples, DPOD may be used in power control techniques at the receiving device (e.g., for closed loop power control). For example, the receiving device may utilize a power control mechanism, such that the power updates may be based on DPOD post processing SNR. That is, the power updates may be based on the post-DPOD SNR rather than the measured SNR (e.g., the pre-DPOD SNR). For example, the receiving device may measure a ratio (e.g., X decibels relative to the carrier (dBc)) of a non-linear distortion component to a thermal noise component of the post-DPOD SNR to determine whether the non-linear distortion component is greater than the thermal noise component. The post-DPOD SNR may be determined (e.g., estimated or measured) using an uplink communication (e.g., one or multiple uplink resources). In some examples, if the ratio is a positive value (e.g., X>0), the performance (e.g., throughput) may be due to non-linear distortions and the transmit power may be reduced. In some other examples, if the ratio is a negative value (e.g., X<0), the performance (e.g., throughput) may be due to thermal noise and the transmit power may be increased.

For example, given a post-DPOD SNR value (e.g., of 10 dB), the receiving device may determine that the ratio of the non-linear distortion component to the thermal noise component is positive (e.g., X=5 dBc) and the determined post processing SNR (e.g., the post-DPOD SNR) is due to non-linear distortions. In such an example, to increase the throughput of communications from the transmitting device, the receiving device may indicate for the transmitting device to decrease the transmit power (e.g., by 2 dB or increase the power output back-off). In other examples, given the same post-DPOD SNR value (e.g., of 10 dB), the receiving device may determine that the ratio of the non-linear distortion component to the thermal noise component is negative (e.g., X=—5 dBc) and the post processing SNR (e.g., the post-DPOD SNR) is due to thermal noise. In such examples, to increase the throughput of communications from the transmitting device, the receiving device may indicate for the transmitting device to increase the transmit power (e.g., by 2 dB or decrease the power output back-off). In other words, to control the transmit power at a transmitting device, the receiving device may generate a power output back-off indication based on the post-DPOD SNR and a ratio of the non-linear distortion component to a thermal noise component of the post-DPOD SNR (e.g., a change in the post-DPOD SNR between the non-linear distortion component and the thermal noise component).

For some DPOD signal processing techniques (e.g., a DPOD signal processing technique at the receiving device), a desired or otherwise acceptable performance (e.g., power output back-off value) may not be achievable with a coarse power control step size. As such, to achieve the desired or otherwise acceptable performance, the receiving device may refine the step size of the power control (e.g., the power back-off step size). For example, the receiving device may initialize a change of the power control step size to the transmitting device. That is, the receiving device may indicate a modified power control step size (e.g., or step pattern) to the transmitting device. For example, the receiving device may select a power control step size based on a difference between the non-linear distortion component and the thermal noise component (e.g., or the value of the ratio of the non-linear distortion component of the post-DPOD SNR to the thermal noise component of the post-DPOD SNR). In some examples, the receiving device may signal such a change (e.g., or an indication of a modified step pattern) via layer one (L1) signaling, layer two (L2) signaling, or radio resource control (RRC) signaling. In some examples, the receiving device may be triggered to signal the modified step pattern based on the estimated ratio of the non-linear distortion component of the post-DPOD SNR to the thermal noise component of the post-DPOD SNR (e.g., a change in the post-DPOD SNR between the non-linear distortion component and the thermal noise component). Additionally or alternatively, an updated (e.g., modified) power control step pattern may have symmetrical capabilities. That is, values of power control step pattern may by symmetrical (e.g., ±1, 0, ±3), such that the transmit power (e.g., or power output back-off) at the transmitting device may be increased or decreased.

In some examples, the receiving device may indicate signal processing capabilities (e.g., DPOD capabilities) to the transmitting device. For example, (e.g., for open loop power control), the transmitting device may determine to increase or decrease the power at the transmitting device (e.g., may make power control determinations) based on an estimated path loss. In such an example, the throughput of communications at the transmitting device may be increased based on the signal processing capabilities of the receiving device. As such, the receiving device may indicate DPOD capabilities of the receiving device to the transmitting device. In some examples, the receiving device may indicate the DPOD capabilities via L1 signaling, L2 signaling, or RRC signaling. Additionally or alternatively, the receiving device may indicate the DPOD capabilities (e.g., or parameters associated with DPOD capabilities) with the power control step pattern (e.g., or the modified power control step pattern).

Various aspects of the present disclosure may provide for increased performance (e.g., throughput gains) and enhanced closed (e.g., inner) loop power control algorithms which consider the capabilities of the receiving device (e.g., to consider the noise floor of the measured SNR). For example, the receiving device may perform an analysis (e.g., via DPOD or otherwise) to determine whether the noise floor is based on non-linear distortions or thermal noise. In some examples, a receiving device may detect a signal and determine that the thermal noise component (e.g., 40 dBc) is reduced relative to the non-linear distortion component (e.g., 20 dBc). In such an example, the power control (e.g., the receiving device) may instruct (e.g., transmit an indication for) the transmitting device to decrease the power (e.g., increase the power output back-off value). Additionally or alternatively, the receiving device may detect a signal and determine that the thermal noise component (e.g., 20 dBc) is increased relative to the non-linear distortion component (e.g., 40 dBc). In such an example, the receiving device may instruct the transmitting device to increase the power (e.g., decrease the power output back-off value).

Figure 4:
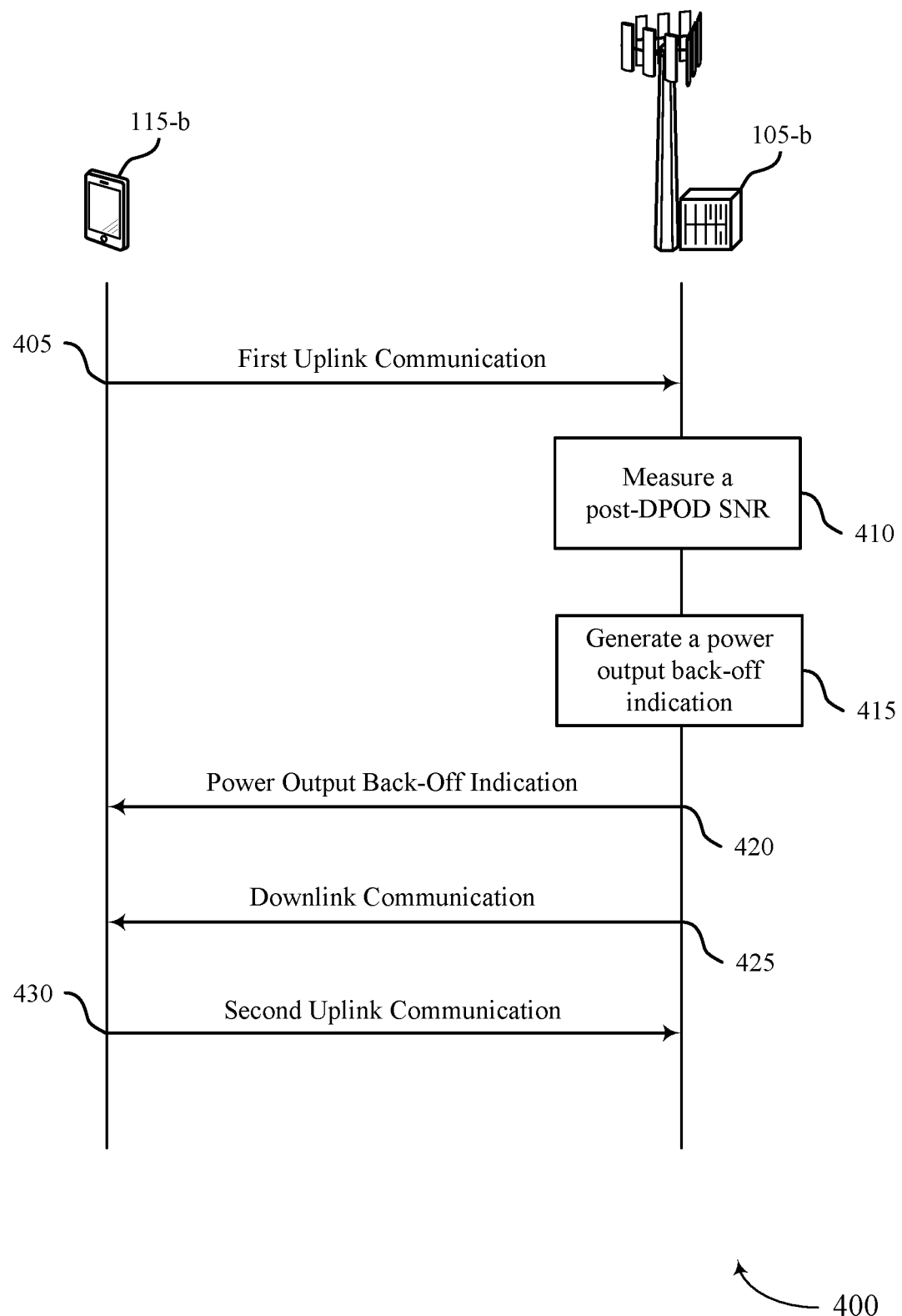
FIG. 4 illustrates an example of a process flow that supports adaptation of power control based on non-linear interference analysis in accordance with aspects of the present disclosure.

FIG. 4 illustrates an example of a process flow 400 that supports adaptation of power control based on non-linear interference analysis in accordance with aspects of the present disclosure. The process flow 400 may implement or be implemented by one or more aspects of the present disclosure. For example, the process flow 400 may be implemented by a base station 105-*b* or a UE 115-*b*, which may be examples of the corresponding devices described with reference to FIGS. 1 and 2. In the example of FIG. 4, the base station 105-*b* may be an example of a receiving device and the UE 115-*b* may be an example of a transmitting device.

In some examples, the base station 105-*b* and the UE 115-*b* may implement the process flow 400 to promote network efficiencies by supporting power control techniques based on non-linear interference analysis. The process flow 400 may also be implemented by the base station 105-*b* and the UE 115-*b* to promote low latency operations and increased throughput communications, among other benefits. In the following description of the process flow 400, the operations between the base station 105-*b* and the UE 115-*b* may be performed in a different order than the example order shown. Additionally or alternatively, the operations performed by the base station 105-*b* and the UE 115-*b* may be performed in different orders or at different times. Some operations may also be omitted.

At 405, the base station 105-*b* may receive a first uplink communication (e.g., a first uplink transmission) from the UE 115-*b* over a wireless channel. The base station 105-*b* may perform DPOD on the first uplink transmission and measure the SNR. For example, at 410, the base station 105-*b* may measure a post-DPOD SNR of the first uplink communication. The post-DPOD SNR may be an example of a post-DPOD SNR described in the present disclosure, including with reference to FIG. 3. At 415, the base station 105-*b* may generate a power output back-off indication for the UE 115-*b* according to the post-DPOD SNR and a change in a post-DPOD noise level (e.g., of the first communication) between a non-linear distortion noise component and a thermal noise component. That is, the base station 105-*b* may generate a power output back-off based on a ratio of the non-linear distortion component of the post-DPOD SNR to the thermal noise component of the post-DPOD SNR. The power output back-off may be an example of a power output back-off described in the present disclosure, including with reference to FIG. 3. Additionally or alternatively, the ratio of the non-linear distortion component of the post-DPOD SNR to the thermal noise component of the post-DPOD SNR may be an example of a ratio described in the present disclosure, including with reference to FIG. 3.

At 420, the base station 105-*b* may transmit the power output back-off indication to the UE 115-*b*. At 425, the base station 105-*b* may transmit a downlink communication (e.g., perform a downlink transmission) to the UE 115-*b*. At 430, in response to the downlink communication, the base station 105-*b* may receive a second uplink communication (e.g., a second uplink transmission) over the wireless channel. The second uplink transmission from the UE 115-*b* may be based on the power output back-off indication, a signal quality metric (e.g., an RSRP) of the downlink communication from the base station 105-*b*, or both.

Figure 5:
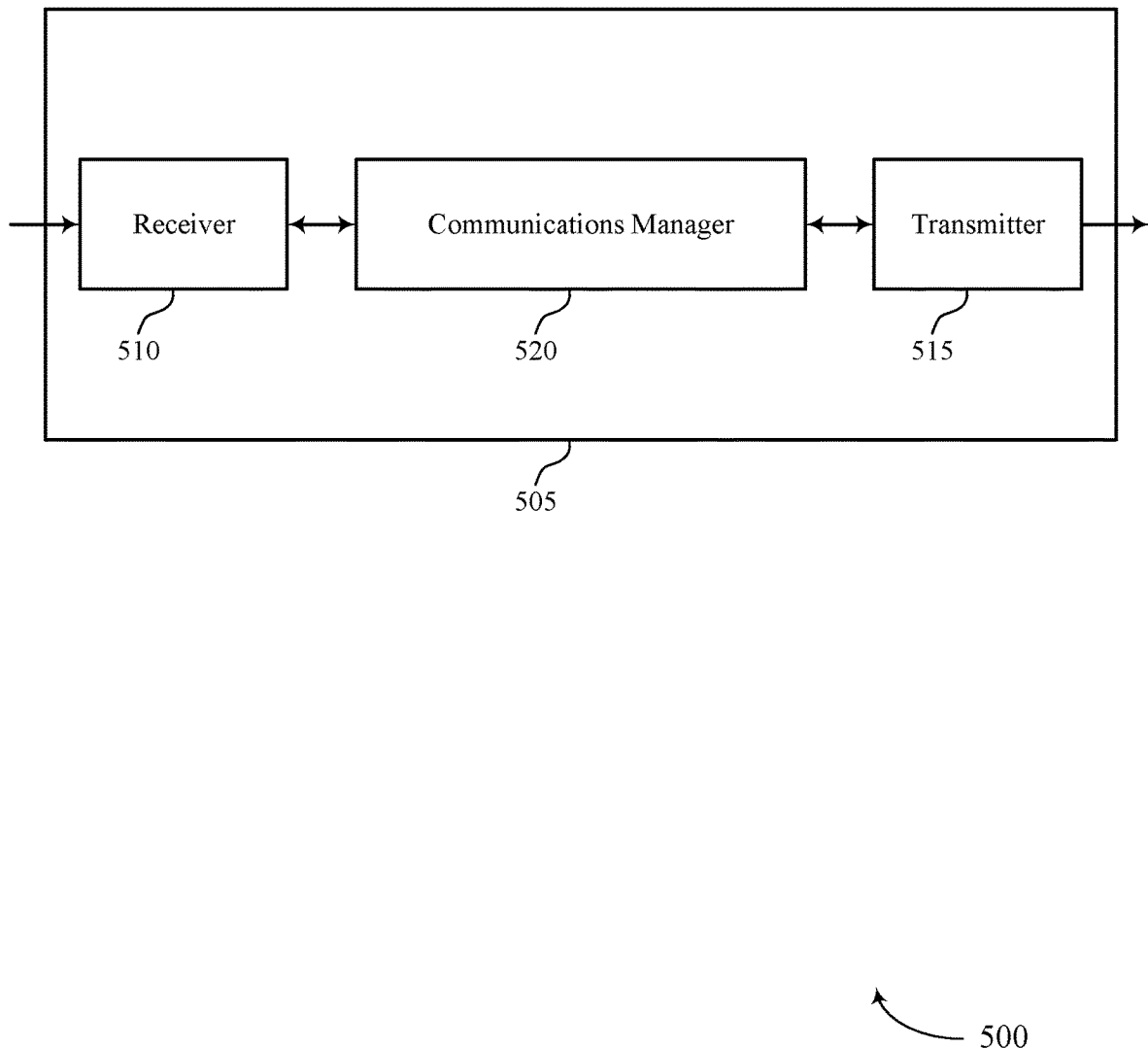
FIGS. 5 and 6 show block diagrams of devices that support adaptation of power control based on non-linear interference analysis in accordance with aspects of the present disclosure.

FIG. 5 shows a block diagram 500 of a device 505 that supports adaptation of power control based on non-linear interference analysis in accordance with aspects of the present disclosure. The device 505 may be an example of aspects of a base station 105 or a receiving device as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to adaptation of power control based on non-linear interference analysis). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to adaptation of power control based on non-linear interference analysis). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of adaptation of power control based on non-linear interference analysis as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a base station (e.g., the device 505, a receiving device) in accordance with examples as disclosed herein. For example, the communications manager 520 may be configured as or otherwise support a means for receiving a transmission from a UE (e.g., a transmitting device) over a wireless channel, where receiving the transmission includes performing DPOD on the transmission. The communications manager 520 may be configured as or otherwise support a means for measuring a post-DPOD SNR of the transmission. The communications manager 520 may be configured as or otherwise support a means for generating a power output back-off indication for the UE according to the post-DPOD SNR and a change in a post-DPOD noise level of the transmission between a non-linear distortion noise component and a thermal noise component. The communications manager 520 may be configured as or otherwise support a means for transmitting the power output back-off indication to the UE.

By including or configuring the communications manager 520 in accordance with examples as described herein, the device 505 (e.g., a processor controlling or otherwise coupled with the receiver 510, the transmitter 515, the communications manager 520, or a combination thereof) may support power control techniques based on non-linear interference analysis. For example, the device 505 may generate a power output back-off indication according to a non-linear interference analysis, which may result in reduced power consumption and more efficient utilization of communication resources.

Figure 6:
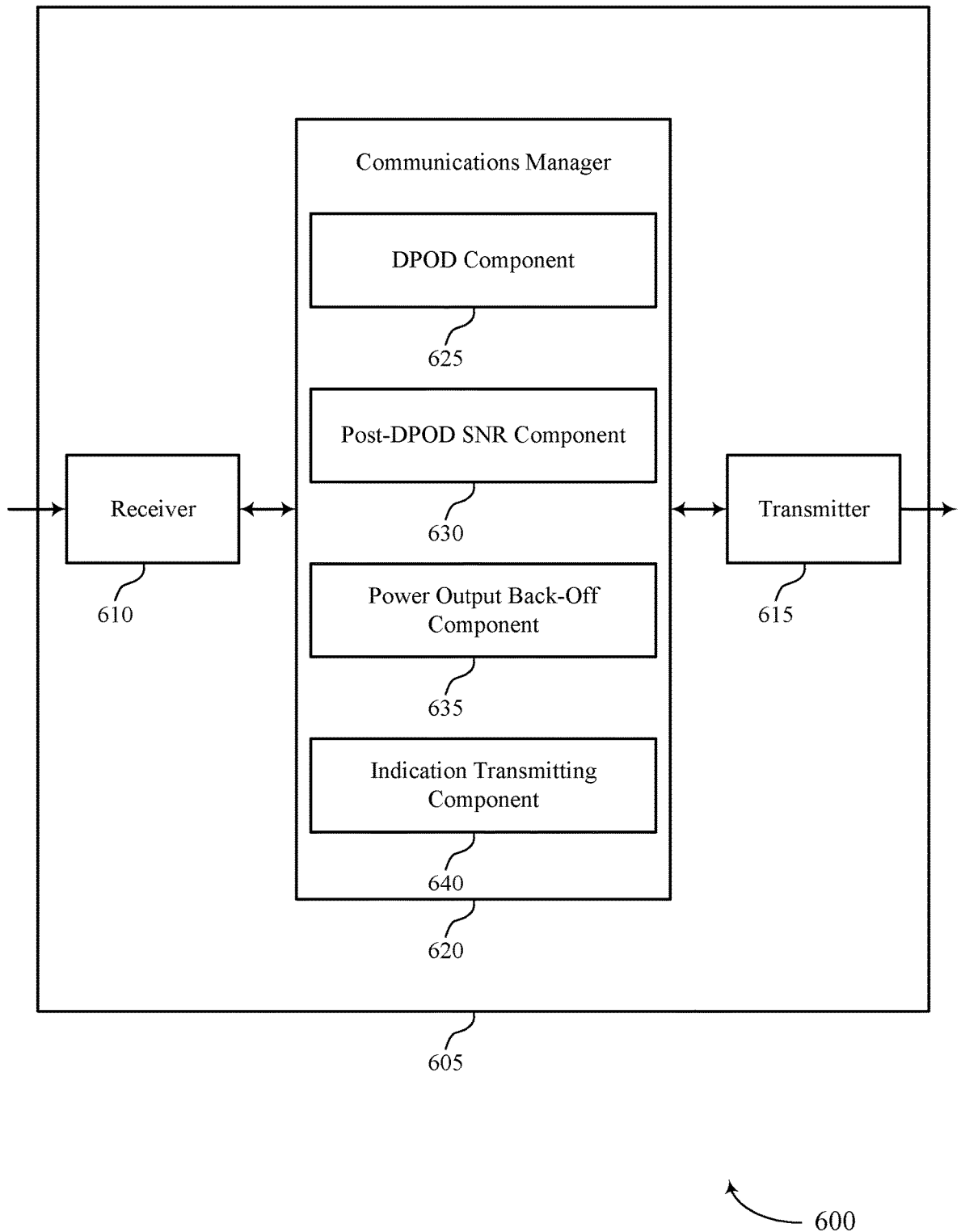

FIG. 6 shows a block diagram 600 of a device 605 that supports adaptation of power control based on non-linear interference analysis in accordance with aspects of the present disclosure. The device 605 may be an example of aspects of a device 505, a base station 105, or a receiving device as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to adaptation of power control based on non-linear interference analysis). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to adaptation of power control based on non-linear interference analysis). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of adaptation of power control based on non-linear interference analysis as described herein. For example, the communications manager 620 may include a DPOD component 625, a post-DPOD SNR component 630, a power output back-off component 635, an indication transmitting component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a base station (e.g., the device 605) in accordance with examples as disclosed herein. The DPOD component 625 may be configured as or otherwise support a means for receiving a transmission from a UE over a wireless channel, where receiving the transmission includes performing DPOD on the transmission. The post-DPOD SNR component 630 may be configured as or otherwise support a means for measuring a post-DPOD SNR of the transmission. The power output back-off component 635 may be configured as or otherwise support a means for generating a power output back-off indication for the UE according to the post-DPOD SNR and a change in a post-DPOD noise level of the transmission between a non-linear distortion noise component and a thermal noise component. The indication transmitting component 640 may be configured as or otherwise support a means for transmitting the power output back-off indication to the UE.

Figure 7:
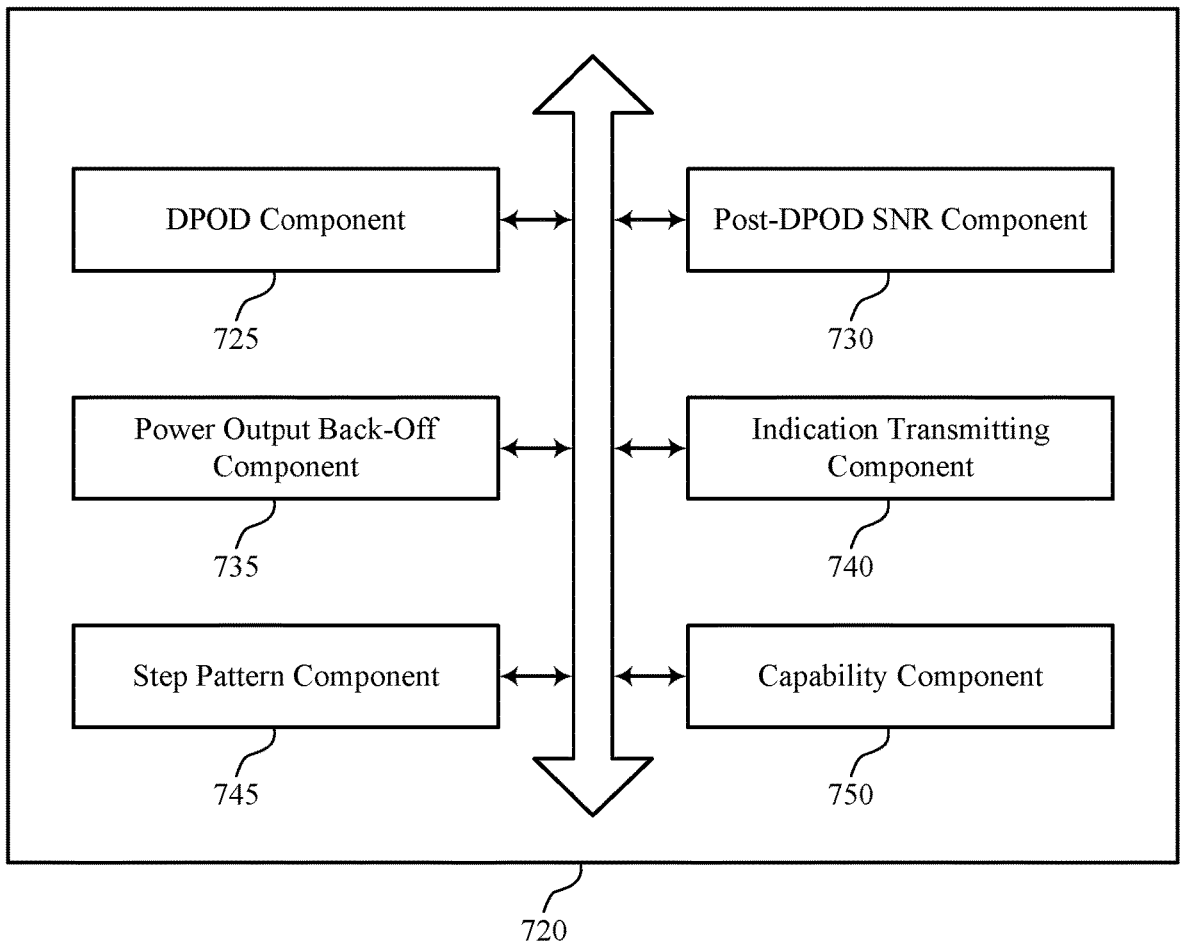
FIG. 7 shows a block diagram of a communications manager that supports adaptation of power control based on non-linear interference analysis in accordance with aspects of the present disclosure.

FIG. 7 shows a block diagram 700 of a communications manager 720 that supports adaptation of power control based on non-linear interference analysis in accordance with aspects of the present disclosure. The communications manager 720 may be an example of aspects of a communications manager 520, a communications manager 620, or both, as described herein. The communications manager 720, or various components thereof, may be an example of means for performing various aspects of adaptation of power control based on non-linear interference analysis as described herein. For example, the communications manager 720 may include a DPOD component 725, a post-DPOD SNR component 730, a power output back-off component 735, an indication transmitting component 740, a step pattern component 745, a capability component 750, or any combination thereof. Each of these components may communicate, directly or indirectly, with one another (e.g., via one or more buses).

The communications manager 720 may support wireless communication at a base station (e.g., a receiving device) in accordance with examples as disclosed herein. The DPOD component 725 may be configured as or otherwise support a means for receiving a transmission from a UE (e.g., a transmitting device) over a wireless channel, where receiving the transmission includes performing DPOD on the transmission. The post-DPOD SNR component 730 may be configured as or otherwise support a means for measuring a post-DPOD SNR of the transmission. The power output back-off component 735 may be configured as or otherwise support a means for generating a power output back-off indication for the UE according to the post-DPOD SNR and a change in a post-DPOD noise level of the transmission between a non-linear distortion noise component and a thermal noise component. The indication transmitting component 740 may be configured as or otherwise support a means for transmitting the power output back-off indication to the UE.

In some examples, the step pattern component 745 may be configured as or otherwise support a means for transmitting to the UE an indication of a modified power output back-off step pattern according to the change in the post-DPOD noise level of the transmission between the non-linear distortion noise component and the thermal noise component. In some examples, the modified power output back-off step pattern includes a set of one or more symmetrical positive and negative power steps.

In some examples, the capability component 750 may be configured as or otherwise support a means for transmitting control signaling to the UE indicating a capability of the base station to perform DPOD, where generating the power output back-off indication for the UE is in accordance with the control signaling. In some examples, a power output back-off step resolution supported by the base station, or a power output back-off step pattern supported by the base station, or both. In some examples, the power output back-off indication includes an indication to decrease uplink transmit power at the UE when the non-linear distortion noise component is larger than the thermal noise component.

In some examples, the power output back-off indication includes an indication to increase uplink transmit power at the UE when the non-linear distortion noise component is smaller than the thermal noise component. In some examples, the power output back-off indication includes a power back-off step selected according to a difference between the non-linear distortion noise component and the thermal noise component. In some examples, the change in the post-DPOD noise level of the transmission between the non-linear distortion noise component and the thermal noise component is determined according to the post-DPOD SNR.

Figure 8:
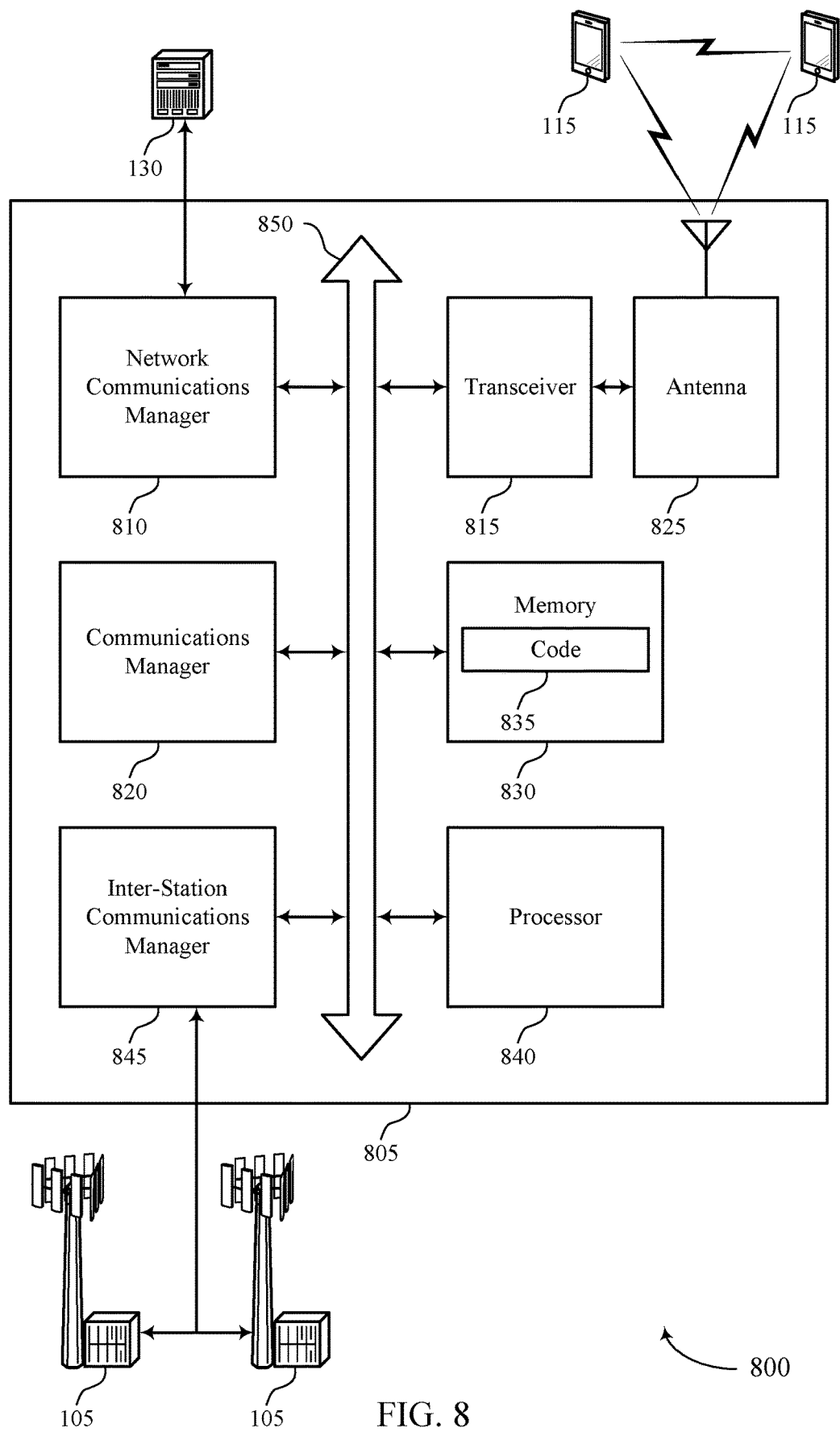
FIG. 8 shows a diagram of a system including a device that supports adaptation of power control based on non-linear interference analysis in accordance with aspects of the present disclosure.

FIG. 8 shows a diagram of a system 800 including a device 805 that supports adaptation of power control based on non-linear interference analysis in accordance with aspects of the present disclosure. The device 805 may be an example of or include the components of a device 505, a device 605, or a base station 105, or a receiving device as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting adaptation of power control based on non-linear interference analysis). For example, the device 805 or a component of the device 805 may include a processor 840 and memory 830 coupled with the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a base station (e.g., the device 805, a receiving device) in accordance with examples as disclosed herein. For example, the communications manager 820 may be configured as or otherwise support a means for receiving a transmission from a UE over a wireless channel, where receiving the transmission includes performing DPOD on the transmission. The communications manager 820 may be configured as or otherwise support a means for measuring a post-DPOD SNR of the transmission. The communications manager 820 may be configured as or otherwise support a means for generating a power output back-off indication for the UE according to the post-DPOD SNR and a change in a post-DPOD noise level of the transmission between a non-linear distortion noise component and a thermal noise component. The communications manager 820 may be configured as or otherwise support a means for transmitting the power output back-off indication to the UE.

By including or configuring the communications manager 820 in accordance with examples as described herein, the device 805 may support power control techniques based on non-linear interference analysis. For example, the device 805 may generate a power output back-off indication according to a non-linear interference analysis, which may result in reduced latency, improved user experience related to reduced processing, reduced power consumption, more efficient utilization of communication resources, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of adaptation of power control based on non-linear interference analysis as described herein, or the processor 840 and the memory 830 may be otherwise configured to perform or support such operations.

Figure 9:
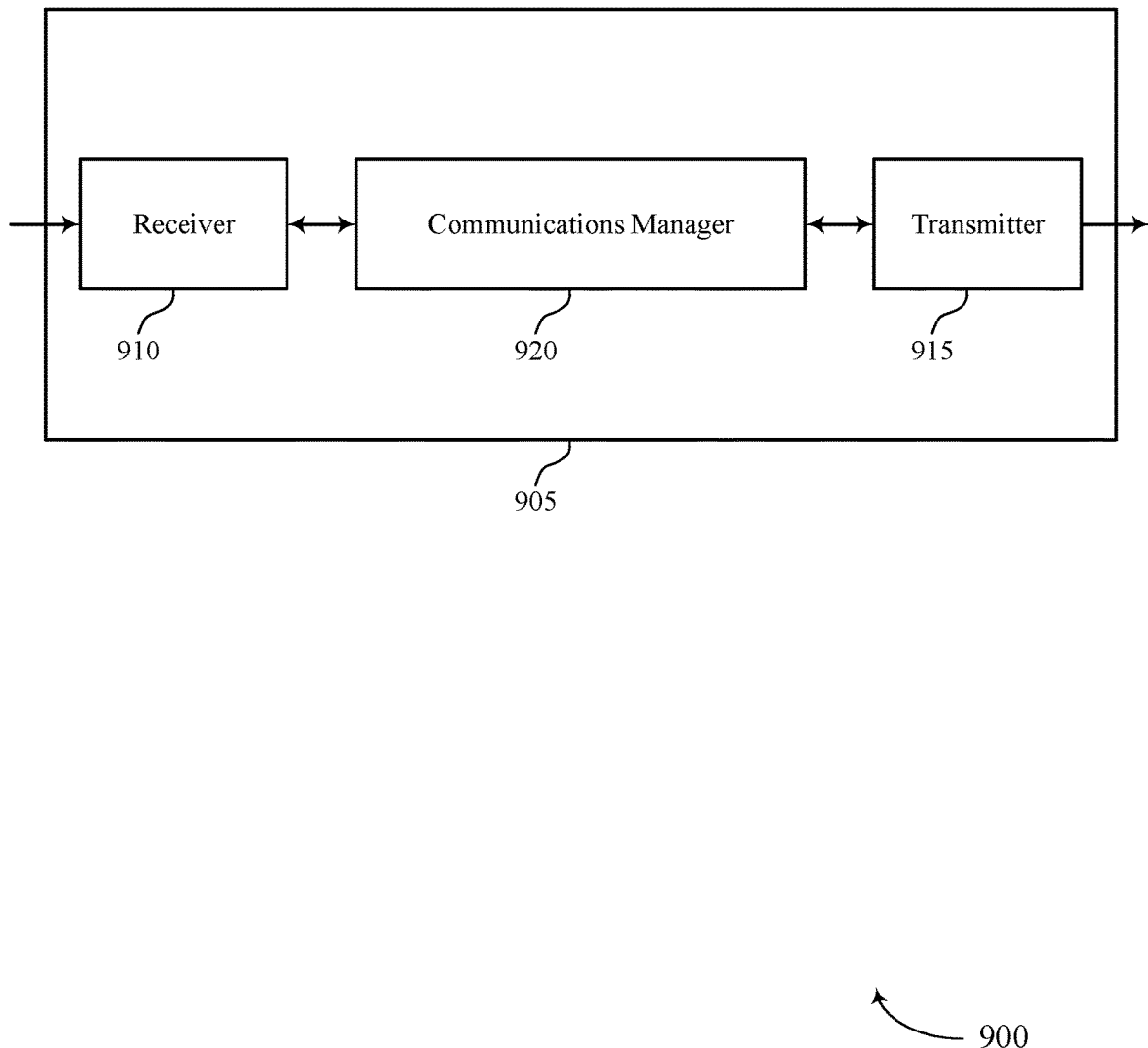
FIGS. 9 and 10 show block diagrams of devices that support adaptation of power control based on non-linear interference analysis in accordance with aspects of the present disclosure.

FIG. 9 shows a block diagram 900 of a device 905 that supports adaptation of power control based on non-linear interference analysis in accordance with aspects of the present disclosure. The device 905 may be an example of aspects of a UE 115 or a transmitting device as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to adaptation of power control based on non-linear interference analysis). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to adaptation of power control based on non-linear interference analysis). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of adaptation of power control based on non-linear interference analysis as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication a UE (e.g., the device 905, a transmitting device) in accordance with examples as disclosed herein. For example, the communications manager 920 may be configured as or otherwise support a means for performing a first uplink transmission to a base station (e.g., a receiving device) over a wireless channel. The communications manager 920 may be configured as or otherwise support a means for receiving a power output back-off indication from the base station, the power output back-off indication based on a post-DPOD SNR of the first uplink transmission and a change in a post-DPOD noise level of the first uplink transmission between a non-linear distortion noise component and a thermal noise component. The communications manager 920 may be configured as or otherwise support a means for receiving a downlink transmission from the base station. The communications manager 920 may be configured as or otherwise support a means for performing a second uplink transmission to the base station over the wireless channel based on the power output back-off indication, an RSRP of the downlink transmission from the base station, or both.

By including or configuring the communications manager 920 in accordance with examples as described herein, the device 905 (e.g., a processor controlling or otherwise coupled with the receiver 910, the transmitter 915, the communications manager 920, or a combination thereof) may support power control techniques based on non-linear interference analysis. For example, the device 905 may performing uplink transmissions based on a power output back-off indication generated according to a non-linear interference analysis, which may result in reduced processing, reduced power consumption, and more efficient utilization of communication resources.

Figure 10:
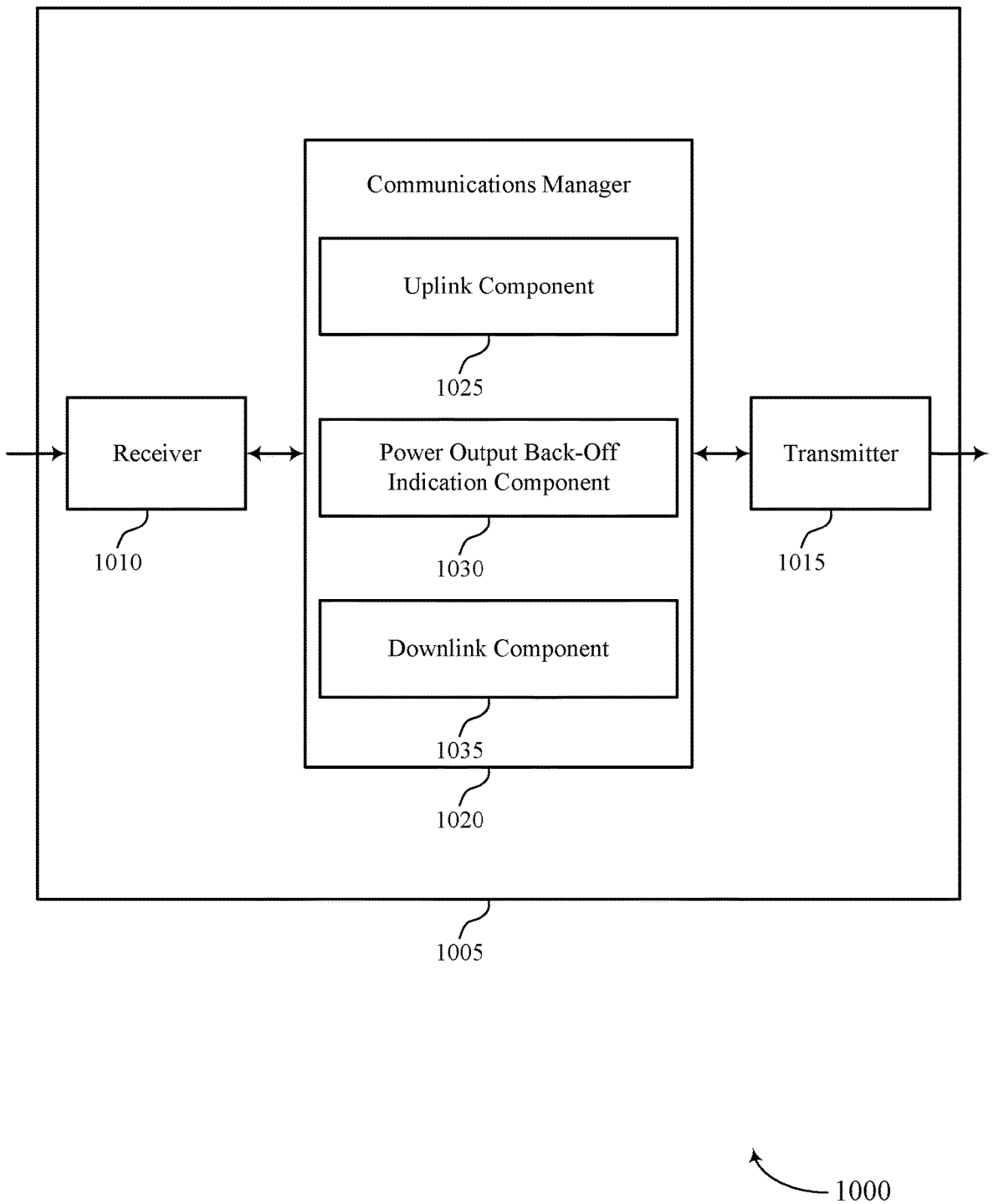

FIG. 10 shows a block diagram 1000 of a device 1005 that supports adaptation of power control based on non-linear interference analysis in accordance with aspects of the present disclosure. The device 1005 may be an example of aspects of a device 905, a UE 115, or a transmitting device as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to adaptation of power control based on non-linear interference analysis). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to adaptation of power control based on non-linear interference analysis). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of adaptation of power control based on non-linear interference analysis as described herein. For example, the communications manager 1020 may include an uplink component 1025, a power output back-off indication component 1030, a downlink component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication a UE (e.g., the device 1005, a transmitting device) in accordance with examples as disclosed herein. The uplink component 1025 may be configured as or otherwise support a means for performing a first uplink transmission to a base station (e.g., a receiving device) over a wireless channel. The power output back-off indication component 1030 may be configured as or otherwise support a means for receiving a power output back-off indication from the base station, the power output back-off indication based on a post-DPOD SNR of the first uplink transmission and a change in a post-DPOD noise level of the first uplink transmission between a non-linear distortion noise component and a thermal noise component. The downlink component 1035 may be configured as or otherwise support a means for receiving a downlink transmission from the base station. The uplink component 1025 may be configured as or otherwise support a means for performing a second uplink transmission to the base station over the wireless channel based on the power output back-off indication, an RSRP of the downlink transmission from the base station, or both.

Figure 11:
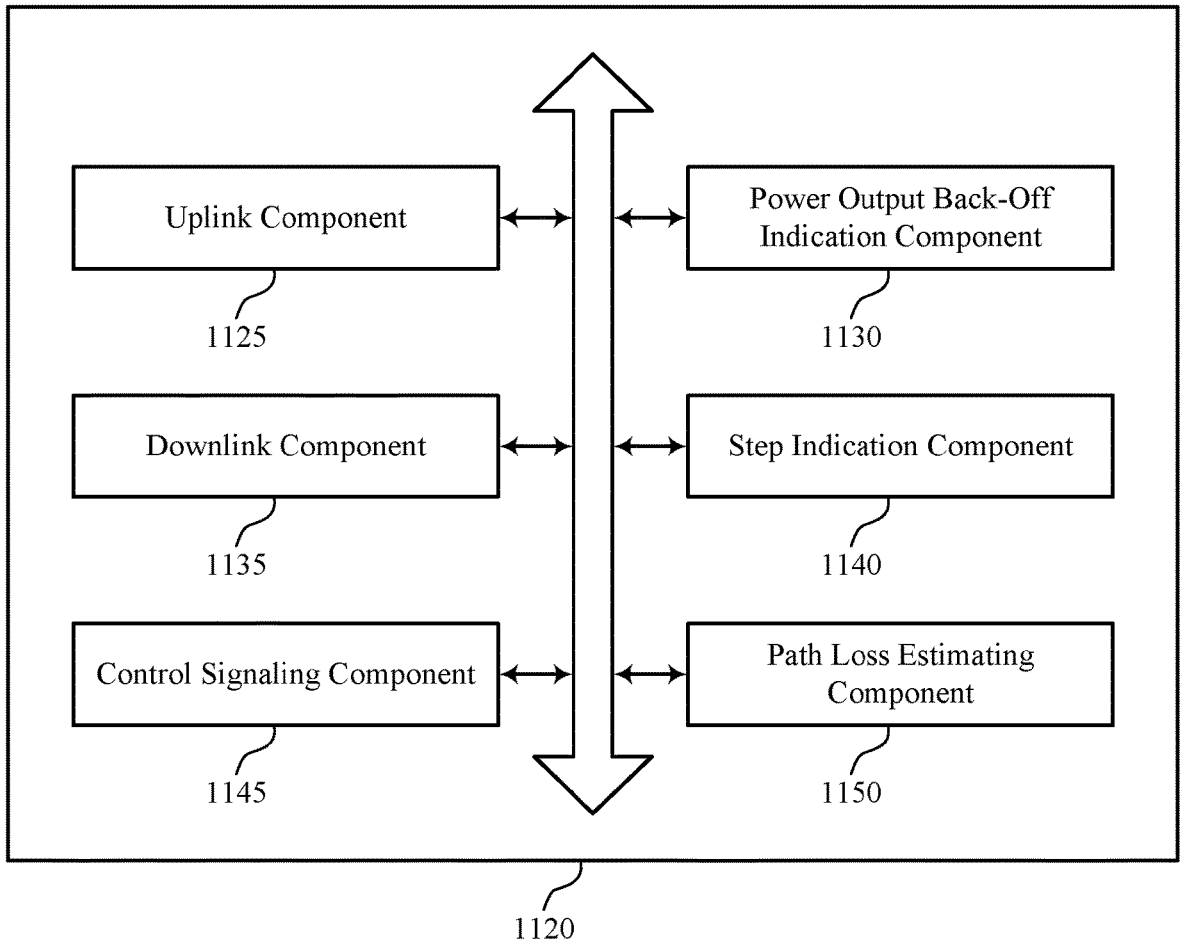
FIG. 11 shows a block diagram of a communications manager that supports adaptation of power control based on non-linear interference analysis in accordance with aspects of the present disclosure.

FIG. 11 shows a block diagram 1100 of a communications manager 1120 that supports adaptation of power control based on non-linear interference analysis in accordance with aspects of the present disclosure. The communications manager 1120 may be an example of aspects of a communications manager 920, a communications manager 1020, or both, as described herein. The communications manager 1120, or various components thereof, may be an example of means for performing various aspects of adaptation of power control based on non-linear interference analysis as described herein. For example, the communications manager 1120 may include an uplink component 1125, a power output back-off indication component 1130, a downlink component 1135, a step indication component 1140, a control signaling component 1145, a path loss estimating component 1150, or any combination thereof. Each of these components may communicate, directly or indirectly, with one another (e.g., via one or more buses).

The communications manager 1120 may support wireless communication a UE (e.g., a transmitting device) in accordance with examples as disclosed herein. The uplink component 1125 may be configured as or otherwise support a means for performing a first uplink transmission to a base station (e.g., a receiving device) over a wireless channel. The power output back-off indication component 1130 may be configured as or otherwise support a means for receiving a power output back-off indication from the base station, the power output back-off indication based on a post-DPOD SNR of the first uplink transmission and a change in a post-DPOD noise level of the first uplink transmission between a non-linear distortion noise component and a thermal noise component. The downlink component 1135 may be configured as or otherwise support a means for receiving a downlink transmission from the base station. In some examples, the uplink component 1125 may be configured as or otherwise support a means for performing a second uplink transmission to the base station over the wireless channel based on the power output back-off indication, an RSRP of the downlink transmission from the base station, or both.

In some examples, the step indication component 1140 may be configured as or otherwise support a means for receiving, from the base station, an indication of a modified power output back-off step pattern according to the change in the post-DPOD noise level of the first uplink transmission between the non-linear distortion noise component and the thermal noise component. In some examples, the modified power output back-off step pattern includes a set of one or more symmetrical positive and negative power steps.

In some examples, the control signaling component 1145 may be configured as or otherwise support a means for receiving control signaling from the UE indicating a capability of the base station to perform DPOD, where the control signaling indicating the capability of the base station to perform DPOD specifies one or more of: a power output back-off step resolution supported by the base station, or a power output back-off step pattern supported by the base station, or both.

In some examples, the path loss estimating component 1150 may be configured as or otherwise support a means for estimating a path loss based on the RSRP of the downlink transmission, where transmitting the second uplink transmission to the base station over the wireless channel is further based at last in part on the estimated path loss and the indicated capability of the base station to perform DPOD.

In some examples, the power output back-off indication includes an indication to decrease uplink transmit power at the UE when the non-linear distortion noise component is larger than the thermal noise component. In some examples, the power output back-off indication includes an indication to increase uplink transmit power at the UE when the non-linear distortion noise component is smaller than the thermal noise component.

In some examples, the power output back-off indication includes a power back-off step selected according to a difference between the non-linear distortion noise component and the thermal noise component. In some examples, the change in the post-DPOD noise level of the first uplink transmission between the non-linear distortion noise component and the thermal noise component is determined according to the post-DPOD SNR.

Figure 12:
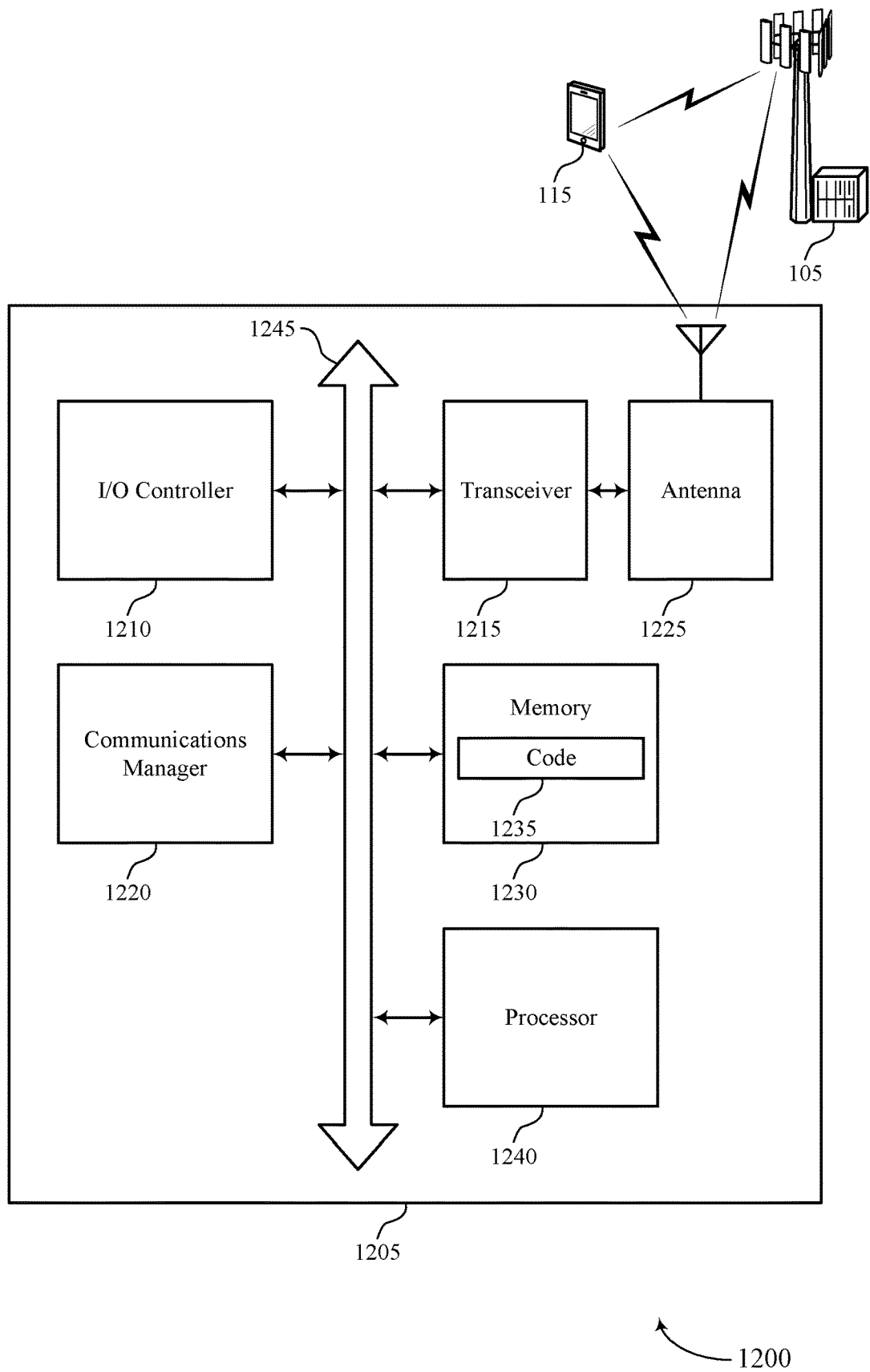
FIG. 12 shows a diagram of a system including a device that supports adaptation of power control based on non-linear interference analysis in accordance with aspects of the present disclosure.

FIG. 12 shows a diagram of a system 1200 including a device 1205 that supports adaptation of power control based on non-linear interference analysis in accordance with aspects of the present disclosure. The device 1205 may be an example of or include the components of a device 905, a device 1005, a UE 115, or a transmitting device as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting adaptation of power control based on non-linear interference analysis). For example, the device 1205 or a component of the device 1205 may include a processor 1240 and memory 1230 coupled with the processor 1240, the processor 1240 and memory 1230 configured to perform various functions described herein.

The communications manager 1220 may support wireless communication a UE (e.g., the device 1205, a transmitting device) in accordance with examples as disclosed herein. For example, the communications manager 1220 may be configured as or otherwise support a means for performing a first uplink transmission to a base station (e.g., a receiving device) over a wireless channel. The communications manager 1220 may be configured as or otherwise support a means for receiving a power output back-off indication from the base station, the power output back-off indication based on a post-DPOD SNR of the first uplink transmission and a change in a post-DPOD noise level of the first uplink transmission between a non-linear distortion noise component and a thermal noise component. The communications manager 1220 may be configured as or otherwise support a means for receiving a downlink transmission from the base station. The communications manager 1220 may be configured as or otherwise support a means for performing a second uplink transmission to the base station over the wireless channel based on the power output back-off indication, an RSRP of the downlink transmission from the base station, or both.

By including or configuring the communications manager 1220 in accordance with examples as described herein, the device 1205 may support power control techniques based on non-linear interference analysis. For example, the device 1205 may performing uplink transmissions based on a power output back-off indication generated according to a non-linear interference analysis, which may result in reduced latency, improved user experience related to reduced processing, reduced power consumption, more efficient utilization of communication resources, longer battery life, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of adaptation of power control based on non-linear interference analysis as described herein, or the processor 1240 and the memory 1230 may be otherwise configured to perform or support such operations.

Figure 13:
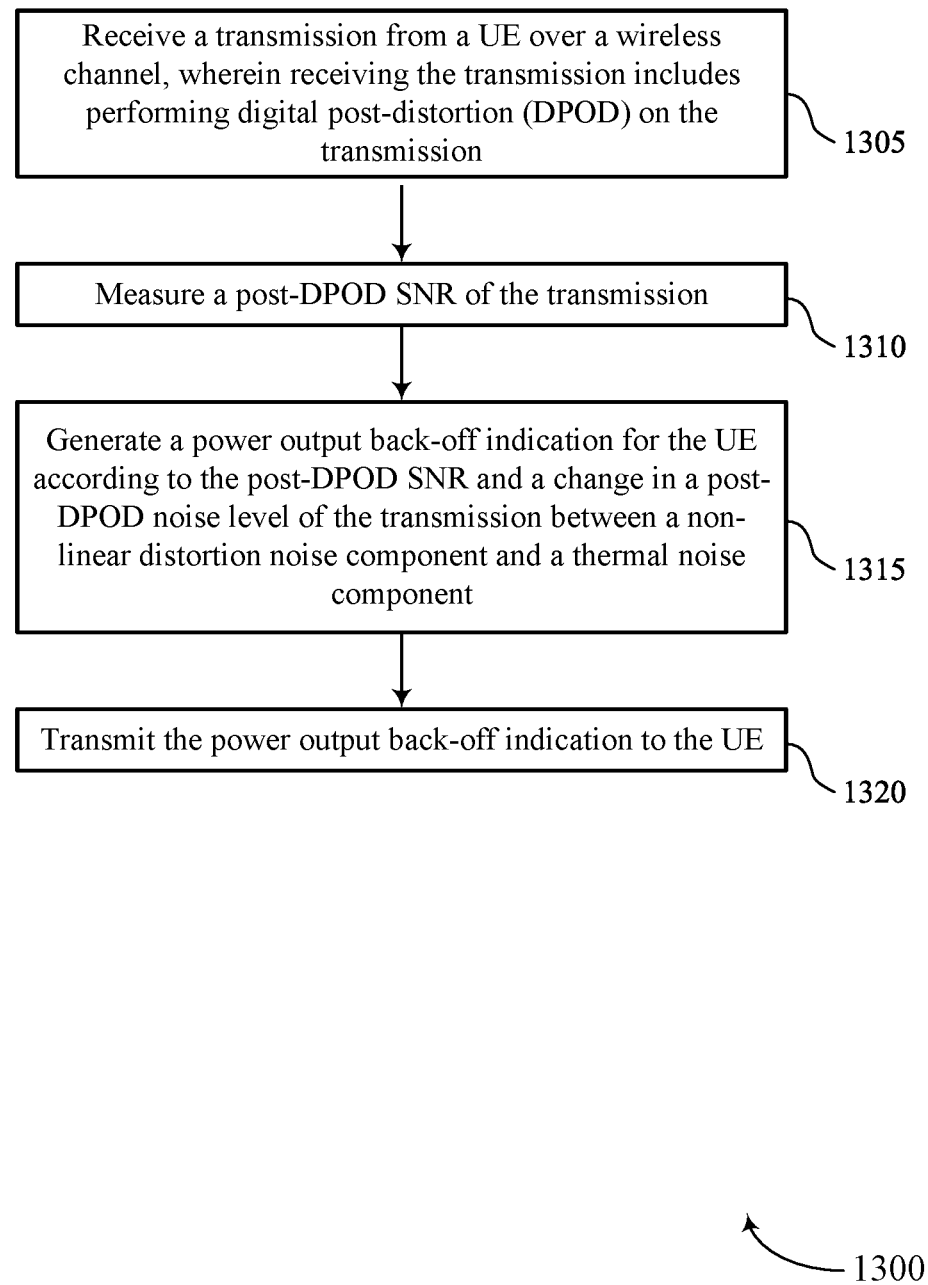
FIGS. 13 through 16 show flowcharts illustrating methods that support adaptation of power control based on non-linear interference analysis in accordance with aspects of the present disclosure.

FIG. 13 shows a flowchart illustrating a method 1300 that supports adaptation of power control based on non-linear interference analysis in accordance with aspects of the present disclosure. The operations of the method 1300 may be implemented by a base station (e.g., a receiving device) or its components as described herein. For example, the operations of the method 1300 may be performed by a base station 105 or a receiving device as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1305, the method may include receiving a transmission from a UE (e.g., a transmitting device) over a wireless channel, where receiving the transmission includes performing DPOD on the transmission. The operations of 1305 may be performed in accordance with examples as disclosed herein. In some examples, aspects of the operations of 1305 may be performed by a DPOD component 725 as described with reference to FIG. 7.

At 1310, the method may include measuring a post-DPOD SNR of the transmission. The operations of 1310 may be performed in accordance with examples as disclosed herein. In some examples, aspects of the operations of 1310 may be performed by a post-DPOD SNR component 730 as described with reference to FIG. 7.

At 1315, the method may include generating a power output back-off indication for the UE according to the post-DPOD SNR and a change in a post-DPOD noise level of the transmission between a non-linear distortion noise component and a thermal noise component. The operations of 1315 may be performed in accordance with examples as disclosed herein. In some examples, aspects of the operations of 1315 may be performed by a power output back-off component 735 as described with reference to FIG. 7.

At 1320, the method may include transmitting the power output back-off indication to the UE. The operations of 1320 may be performed in accordance with examples as disclosed herein. In some examples, aspects of the operations of 1320 may be performed by an indication transmitting component 740 as described with reference to FIG. 7.

Figure 14:
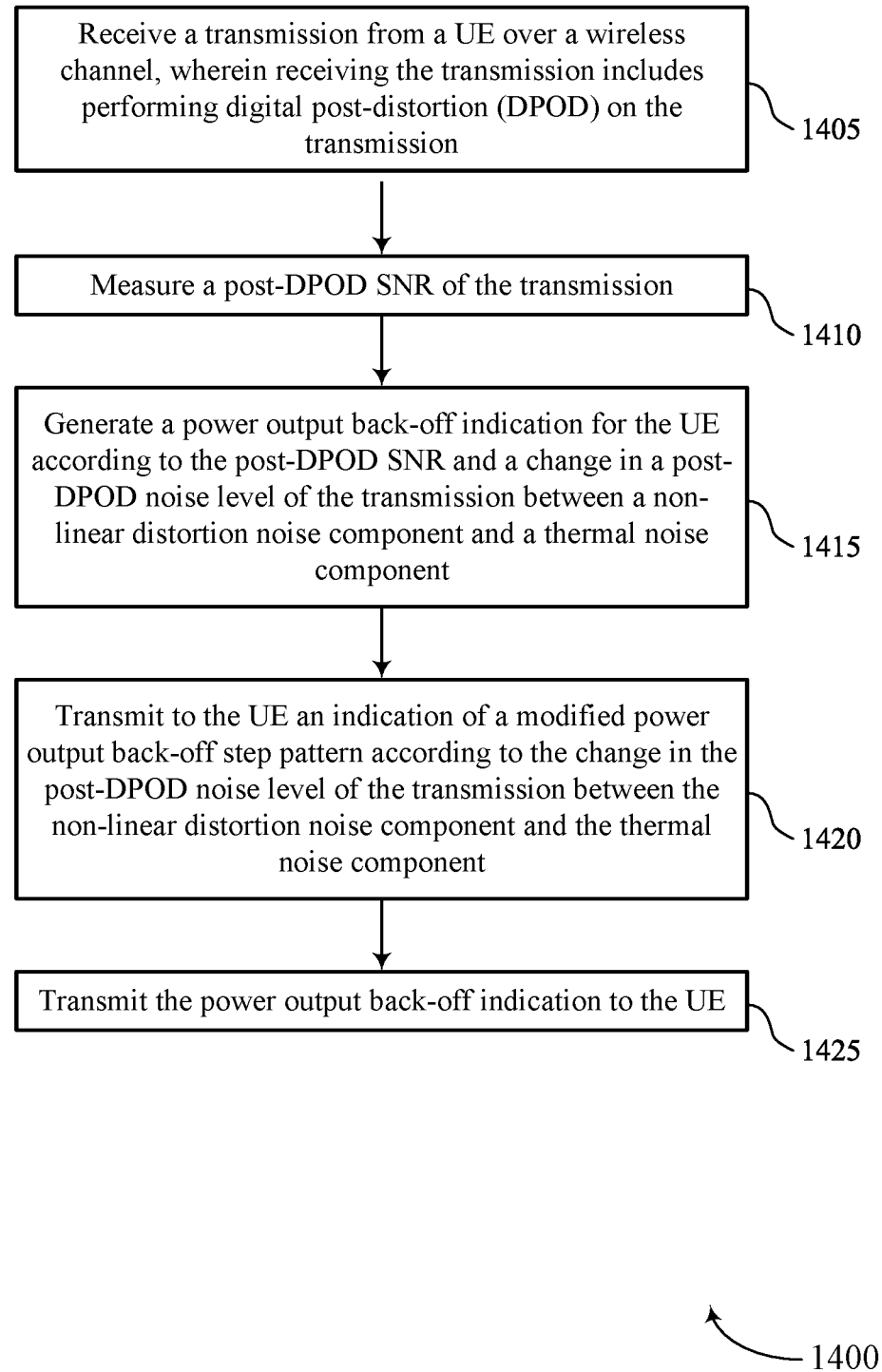

FIG. 14 shows a flowchart illustrating a method 1400 that supports adaptation of power control based on non-linear interference analysis in accordance with aspects of the present disclosure. The operations of the method 1400 may be implemented by a base station (e.g., a receiving device) or its components as described herein. For example, the operations of the method 1400 may be performed by a base station 105 or a receiving device as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1405, the method may include receiving a transmission from a UE (e.g., a transmitting device) over a wireless channel, where receiving the transmission includes performing DPOD on the transmission. The operations of 1405 may be performed in accordance with examples as disclosed herein. In some examples, aspects of the operations of 1405 may be performed by a DPOD component 725 as described with reference to FIG. 7.

At 1410, the method may include measuring a post-DPOD SNR of the transmission. The operations of 1410 may be performed in accordance with examples as disclosed herein. In some examples, aspects of the operations of 1410 may be performed by a post-DPOD SNR component 730 as described with reference to FIG. 7.

At 1415, the method may include generating a power output back-off indication for the UE according to the post-DPOD SNR and a change in a post-DPOD noise level of the transmission between a non-linear distortion noise component and a thermal noise component. The operations of 1415 may be performed in accordance with examples as disclosed herein. In some examples, aspects of the operations of 1415 may be performed by a power output back-off component 735 as described with reference to FIG. 7.

At 1420, the method may include transmitting to the UE an indication of a modified power output back-off step pattern according to the change in the post-DPOD noise level of the transmission between the non-linear distortion noise component and the thermal noise component. The operations of 1420 may be performed in accordance with examples as disclosed herein. In some examples, aspects of the operations of 1420 may be performed by a step pattern component 745 as described with reference to FIG. 7.

At 1425, the method may include transmitting the power output back-off indication to the UE. The operations of 1425 may be performed in accordance with examples as disclosed herein. In some examples, aspects of the operations of 1425 may be performed by an indication transmitting component 740 as described with reference to FIG. 7.

Figure 15:
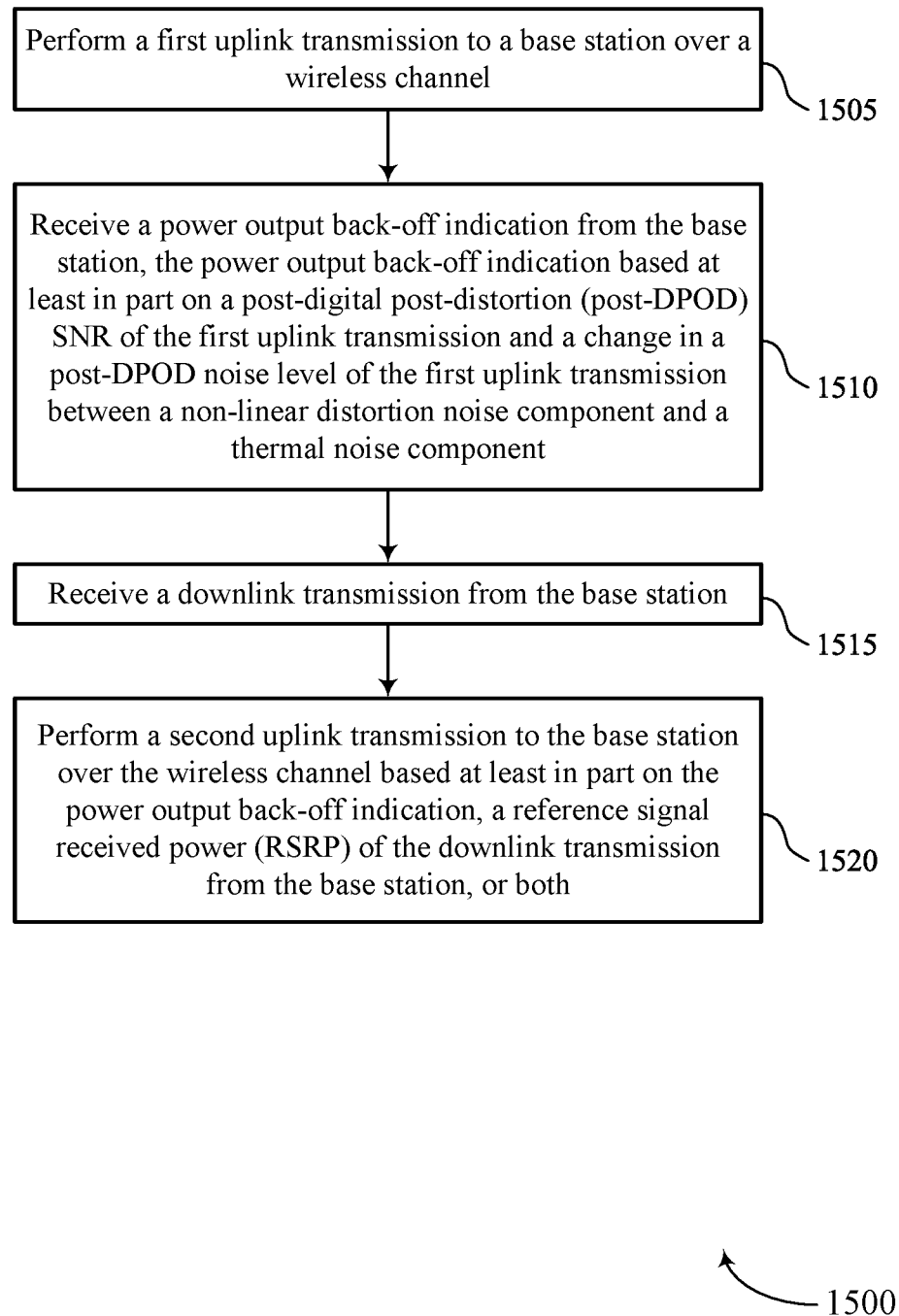

FIG. 15 shows a flowchart illustrating a method 1500 that supports adaptation of power control based on non-linear interference analysis in accordance with aspects of the present disclosure. The operations of the method 1500 may be implemented by a UE (e.g., a transmitting device) or its components as described herein. For example, the operations of the method 1500 may be performed by a UE 115 or a transmitting device as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1505, the method may include performing a first uplink transmission to a base station over a wireless channel. The operations of 1505 may be performed in accordance with examples as disclosed herein. In some examples, aspects of the operations of 1505 may be performed by an uplink component 1125 as described with reference to FIG. 11.

At 1510, the method may include receiving a power output back-off indication from the base station, the power output back-off indication based on a post-DPOD SNR of the first uplink transmission and a change in a post-DPOD noise level of the first uplink transmission between a non-linear distortion noise component and a thermal noise component. The operations of 1510 may be performed in accordance with examples as disclosed herein. In some examples, aspects of the operations of 1510 may be performed by a power output back-off indication component 1130 as described with reference to FIG. 11.

At 1515, the method may include receiving a downlink transmission from the base station. The operations of 1515 may be performed in accordance with examples as disclosed herein. In some examples, aspects of the operations of 1515 may be performed by a downlink component 1135 as described with reference to FIG. 11.

At 1520, the method may include performing a second uplink transmission to the base station over the wireless channel based on the power output back-off indication, an RSRP of the downlink transmission from the base station, or both. The operations of 1520 may be performed in accordance with examples as disclosed herein. In some examples, aspects of the operations of 1520 may be performed by an uplink component 1125 as described with reference to FIG. 11.

Figure 16:
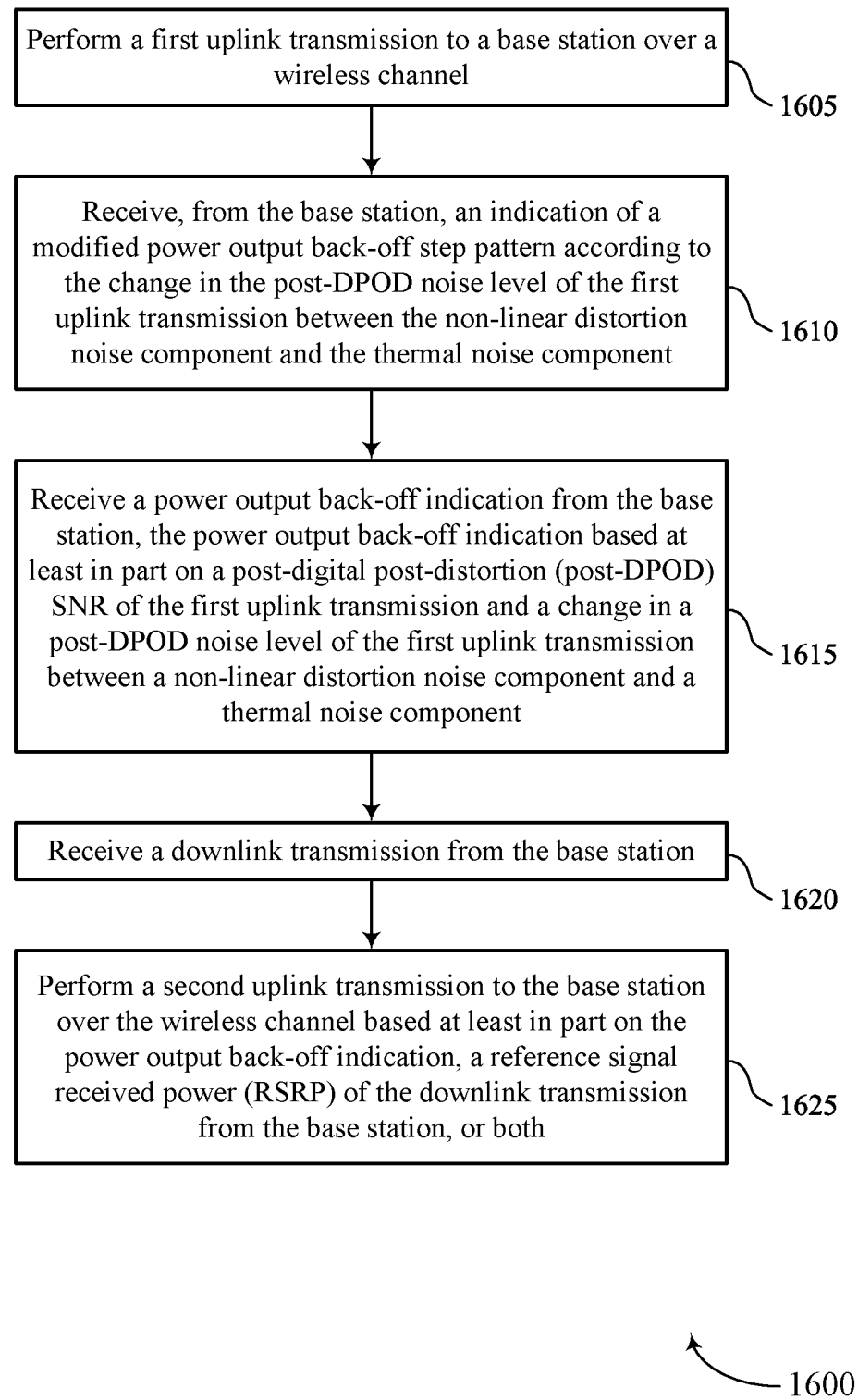

FIG. 16 shows a flowchart illustrating a method 1600 that supports adaptation of power control based on non-linear interference analysis in accordance with aspects of the present disclosure. The operations of the method 1600 may be implemented by a UE (e.g., a transmitting device) or its components as described herein. For example, the operations of the method 1600 may be performed by a UE 115 or a transmitting device as described with reference to FIGS. 1 through 4 and 9 through 12. In some examples, a UE may execute a set of instructions to control the functional elements of the UE to perform the described functions. Additionally or alternatively, the UE may perform aspects of the described functions using special-purpose hardware.

At 1605, the method may include performing a first uplink transmission to a base station over a wireless channel. The operations of 1605 may be performed in accordance with examples as disclosed herein. In some examples, aspects of the operations of 1605 may be performed by an uplink component 1125 as described with reference to FIG. 11.

At 1610, the method may include receiving, from the base station, an indication of a modified power output back-off step pattern according to the change in the post-DPOD noise level of the first uplink transmission between the non-linear distortion noise component and the thermal noise component. The operations of 1610 may be performed in accordance with examples as disclosed herein. In some examples, aspects of the operations of 1610 may be performed by a step indication component 1140 as described with reference to FIG. 11.

At 1615, the method may include receiving a power output back-off indication from the base station, the power output back-off indication based on a post-DPOD SNR of the first uplink transmission and a change in a post-DPOD noise level of the first uplink transmission between a non-linear distortion noise component and a thermal noise component. The operations of 1615 may be performed in accordance with examples as disclosed herein. In some examples, aspects of the operations of 1615 may be performed by a power output back-off indication component 1130 as described with reference to FIG. 11.

At 1620, the method may include receiving a downlink transmission from the base station. The operations of 1620 may be performed in accordance with examples as disclosed herein. In some examples, aspects of the operations of 1620 may be performed by a downlink component 1135 as described with reference to FIG. 11.

At 1625, the method may include performing a second uplink transmission to the base station over the wireless channel based on the power output back-off indication, an RSRP of the downlink transmission from the base station, or both. The operations of 1625 may be performed in accordance with examples as disclosed herein. In some examples, aspects of the operations of 1625 may be performed by an uplink component 1125 as described with reference to FIG. 11.

The following provides an overview of aspects of the present disclosure:

Aspect 1: A method for wireless communication at a base station, comprising: receiving a transmission from a UE over a wireless channel, wherein receiving the transmission includes performing DPOD on the transmission; measuring a post-DPOD SNR of the transmission; generating a power output back-off indication for the UE according to the post-DPOD SNR and a change in a post-DPOD noise level of the transmission between a non-linear distortion noise component and a thermal noise component; and transmitting the power output back-off indication to the UE.

Aspect 2: The method of aspect 1, further comprising: transmitting to the UE an indication of a modified power output back-off step pattern according to the change in the post-DPOD noise level of the transmission between the non-linear distortion noise component and the thermal noise component.

Aspect 3: The method of aspect 2, wherein the modified power output back-off step pattern comprises a set of one or more symmetrical positive and negative power steps.

Aspect 4: The method of any of aspects 1 through 3, further comprising: transmitting control signaling to the UE indicating a capability of the base station to perform DPOD, wherein generating the power output back-off indication for the UE is in accordance with the control signaling.

Aspect 5: The method of aspect 4, wherein the control signaling indicating the capability of the base station to perform DPOD specifies one or more of a power output back-off step resolution supported by the base station, or a power output back-off step pattern supported by the base station, or both.

Aspect 6: The method of any of aspects 1 through 5, wherein the power output back-off indication comprises an indication to decrease uplink transmit power at the UE when the non-linear distortion noise component is larger than the thermal noise component.

Aspect 7: The method of any of aspects 1 through 6, wherein the power output back-off indication comprises an indication to increase uplink transmit power at the UE when the non-linear distortion noise component is smaller than the thermal noise component.

Aspect 8: The method of any of aspects 1 through 7, wherein the power output back-off indication comprises a power back-off step selected according to a difference between the non-linear distortion noise component and the thermal noise component.

Aspect 9: The method of any of aspects 1 through 8, wherein the change in the post-DPOD noise level of the transmission between the non-linear distortion noise component and the thermal noise component is determined according to the post-DPOD SNR.

Aspect 10: A method for wireless communication a UE, comprising: performing a first uplink transmission to a base station over a wireless channel; receiving a power output back-off indication from the base station, the power output back-off indication based at least in part on a post-DPOD SNR of the first uplink transmission and a change in a post-DPOD noise level of the first uplink transmission between a non-linear distortion noise component and a thermal noise component; receiving a downlink transmission from the base station; and performing a second uplink transmission to the base station over the wireless channel based at least in part on the power output back-off indication, an RSRP of the downlink transmission from the base station, or both.

Aspect 11: The method of aspect 10, further comprising: receiving, from the base station, an indication of a modified power output back-off step pattern according to the change in the post-DPOD noise level of the first uplink transmission between the non-linear distortion noise component and the thermal noise component.

Aspect 12: The method of aspect 11, wherein the modified power output back-off step pattern comprises a set of one or more symmetrical positive and negative power steps.

Aspect 13: The method of any of aspects 10 through 12, further comprising: receiving control signaling from the UE indicating a capability of the base station to perform DPOD, wherein the control signaling indicating the capability of the base station to perform DPOD specifies one or more of: a power output back-off step resolution supported by the base station, or a power output back-off step pattern supported by the base station, or both.

Aspect 14: The method of aspect 13, further comprising: estimating a path loss based at least in part on the RSRP of the downlink transmission, wherein transmitting the second uplink transmission to the base station over the wireless channel is further based at last in part on the estimated path loss and the indicated capability of the base station to perform DPOD.

Aspect 15: The method of any of aspects 10 through 14, wherein the power output back-off indication comprises an indication to decrease uplink transmit power at the UE when the non-linear distortion noise component is larger than the thermal noise component.

Aspect 16: The method of any of aspects 10 through 15, wherein the power output back-off indication comprises an indication to increase uplink transmit power at the UE when the non-linear distortion noise component is smaller than the thermal noise component.

Aspect 17: The method of any of aspects 10 through 16, wherein the power output back-off indication comprises a power back-off step selected according to a difference between the non-linear distortion noise component and the thermal noise component.

Aspect 18: The method of any of aspects 10 through 17, wherein the change in the post-DPOD noise level of the first uplink transmission between the non-linear distortion noise component and the thermal noise component is determined according to the post-DPOD SNR.

Aspect 19: An apparatus for wireless communication at a base station, comprising a processor; memory coupled with the processor; and instructions stored in the memory and executable by the processor to cause the apparatus to perform a method of any of aspects 1 through 9.

Aspect 20: An apparatus for wireless communication at a base station, comprising at least one means for performing a method of any of aspects 1 through 9.

Aspect 21: A non-transitory computer-readable medium storing code for wireless communication at a base station, the code comprising instructions executable by a processor to perform a method of any of aspects 1 through 9.

Aspect 22: An apparatus for wireless communication a UE, comprising a processor; memory coupled with the processor; and instructions stored in the memory and executable by the processor to cause the apparatus to perform a method of any of aspects 10 through 18.

Aspect 23: An apparatus for wireless communication a UE, comprising at least one means for performing a method of any of aspects 10 through 18.

Aspect 24: A non-transitory computer-readable medium storing code for wireless communication a UE, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the processor-executable code to cause the UE to:
perform a first uplink transmission to a base station over a wireless channel;
receive a power output back-off indication from the base station, the power output back-off indication based at least in part on a post-digital post-distortion (post-DPOD) signal-to-noise ratio (SNR) of the first uplink transmission and a change in a post-DPOD noise level of the first uplink transmission between a non-linear distortion noise component and a thermal noise component;
receive a downlink transmission from the base station; and
perform a second uplink transmission to the base station over the wireless channel based at least in part on the power output back-off indication, a reference signal received power (RSRP) of the downlink transmission from the base station, or both.

2. The UE of claim 1, wherein the one or more processors are individually or collectively further operable to execute the processor-executable code to cause the UE to:
receive, from the base station, an indication of a modified power output back-off step pattern according to the change in the post-DPOD noise level of the first uplink transmission between the non-linear distortion noise component and the thermal noise component.

3. The UE of claim 2, wherein the modified power output back-off step pattern comprises a set of one or more symmetrical positive and negative power steps.

4. The UE of claim 1, wherein the one or more processors are individually or collectively further operable to execute the processor-executable code to cause the UE to:
receive control signaling from the UE indicating a capability of the base station to perform DPOD, wherein the control signaling indicating the capability of the base station to perform DPOD specifies one or more of: a power output back-off step resolution supported by the base station, or a power output back-off step pattern supported by the base station, or both.

5. The UE of claim 4, wherein the one or more processors are individually or collectively further operable to execute the processor-executable code to cause the UE to:
estimate a path loss based at least in part on the RSRP of the downlink transmission, wherein transmitting the second uplink transmission to the base station over the wireless channel is further based at least in part on the estimated path loss and the indicated capability of the base station to perform DPOD.

6. The UE of claim 1, wherein the power output back-off indication comprises an indication to decrease uplink transmit power at the UE when the non-linear distortion noise component is larger than the thermal noise component.

7. The UE of claim 1, wherein the power output back-off indication comprises an indication to increase uplink transmit power at the UE when the non-linear distortion noise component is smaller than the thermal noise component.

8. The UE of claim 1, wherein the power output back-off indication comprises a power back-off step selected according to a difference between the non-linear distortion noise component and the thermal noise component.

9. The UE of claim 1, wherein the change in the post-DPOD noise level of the first uplink transmission between the non-linear distortion noise component and the thermal noise component is determined according to the post-DPOD SNR.

10. A method for wireless communication a user equipment (UE), comprising:
performing a first uplink transmission to a base station over a wireless channel;
receiving a power output back-off indication from the base station, the power output back-off indication based at least in part on a post-digital post-distortion (post-DPOD) signal-to-noise ratio (SNR) of the first uplink transmission and a change in a post-DPOD noise level of the first uplink transmission between a non-linear distortion noise component and a thermal noise component;

receiving a downlink transmission from the base station; and performing a second uplink transmission to the base station over the wireless channel based at least in part on the power output back-off indication, a reference signal received power (RSRP) of the downlink transmission from the base station, or both.

11. The method of claim 10, further comprising:

receiving, from the base station, an indication of a modified power output back-off step pattern according to the change in the post-DPOD noise level of the first uplink transmission between the non-linear distortion noise component and the thermal noise component.

12. The method of claim 11, wherein the modified power output back-off step pattern comprises a set of one or more symmetrical positive and negative power steps.

13. The method of claim 10, further comprising:

receiving control signaling from the UE indicating a capability of the base station to perform DPOD, wherein the control signaling indicating the capability of the base station to perform DPOD specifies one or more of: a power output back-off step resolution supported by the base station, or a power output back-off step pattern supported by the base station, or both.

14. The method of claim 13, further comprising:

estimating a path loss based at least in part on the RSRP of the downlink transmission, wherein transmitting the second uplink transmission to the base station over the wireless channel is further based at least in part on the estimated path loss and the indicated capability of the base station to perform DPOD.

15. The method of claim 10, wherein the power output back-off indication comprises an indication to decrease uplink transmit power at the UE when the non-linear distortion noise component is larger than the thermal noise component.

16. The method of claim 10, wherein the power output back-off indication comprises an indication to increase uplink transmit power at the UE when the non-linear distortion noise component is smaller than the thermal noise component.

17. The method of claim 10, wherein the power output back-off indication comprises a power back-off step selected according to a difference between the non-linear distortion noise component and the thermal noise component.

18. Method of claim 10, wherein the change in the post-DPOD noise level of the first uplink transmission between the non-linear distortion noise component and the thermal noise component is determined according to the post-DPOD SNR.

* * * * *